United States Patent
Zhou et al.

(10) Patent No.: US 12,206,592 B2
(45) Date of Patent: Jan. 21, 2025

(54) TECHNIQUES FOR DEADLINE-AWARE SCHEDULING

(71) Applicant: QUALCOMM Incorporated, San Diego, CA (US)

(72) Inventors: Shanyu Zhou, San Diego, CA (US); Arumugam Chendamarai Kannan, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 699 days.

(21) Appl. No.: 17/520,382

(22) Filed: Nov. 5, 2021

(65) Prior Publication Data
US 2023/0146991 A1     May 11, 2023

(51) Int. Cl.
*H04W 76/38*     (2018.01)
*H04L 47/28*     (2022.01)
*H04W 72/51*     (2023.01)
*H04W 72/563*    (2023.01)

(52) U.S. Cl.
CPC .......... *H04L 47/286* (2013.01); *H04W 72/51* (2023.01); *H04W 72/563* (2023.01); *H04W 76/38* (2018.02)

(58) Field of Classification Search
CPC ... H04W 28/02; H04W 76/38; H04W 72/563; H04W 72/51; H04L 47/286
See application file for complete search history.

(56) References Cited

U.S. PATENT DOCUMENTS

| | | | | |
|---|---|---|---|---|
| 6,876,670 B1 * | 4/2005 | Budrikis | ............. | H04L 47/2416 370/468 |
| 6,879,561 B1 * | 4/2005 | Zhang | ................... | H04L 1/0017 370/235 |
| 7,609,671 B1 * | 10/2009 | Nuriyev | ................... | H04L 47/50 370/328 |

(Continued)

FOREIGN PATENT DOCUMENTS

| | | | | |
|---|---|---|---|---|
| EP | 1137226 A2 * | 9/2001 | ............. | G10L 25/78 |
| JP | 2001313717 A * | 11/2001 | ............. | G10L 25/78 |

OTHER PUBLICATIONS

International Search Report and Written Opinion—PCT/US2022/045806—ISA/EPO—Dec. 19, 2022.

*Primary Examiner* — Hassan A Phillips
*Assistant Examiner* — Prenell P Jones
(74) *Attorney, Agent, or Firm* — Holland & Hart LLP/Qualcomm

(57) ABSTRACT

Methods, systems, and devices for wireless communications are described. A user equipment (UE) may be configured to generate a set of data packets that are to be transmitted to a base station, where each data packet of the set of data packets is associated with a respective packet expiration time. The UE may transmit an indication of packet expiration information associated with the set of data packets, where the packet expiration information is based on a set of packet expiration times associated with the set of data packets. The UE may receive, from the base station, scheduling information associated with at least a subset of the set of data packets, where the scheduling information is based on the packet expiration information. The UE may then transmit at least one data packet of the subset data packets to the base station in accordance with the scheduling information.

30 Claims, 16 Drawing Sheets

(56) References Cited

U.S. PATENT DOCUMENTS

| | | | | |
|---|---|---|---|---|
| 9,445,284 | B2* | 9/2016 | Bontu | H04W 24/02 |
| 10,187,400 | B1* | 1/2019 | Castro | H04L 63/1408 |
| 2003/0095538 | A1* | 5/2003 | Kayama | H04L 47/10 |
| | | | | 370/503 |
| 2004/0208158 | A1* | 10/2004 | Fellman | H04L 12/6418 |
| | | | | 370/345 |
| 2007/0249360 | A1* | 10/2007 | Das | H04W 72/21 |
| | | | | 455/450 |
| 2008/0186931 | A1* | 8/2008 | Prakash | H04W 28/24 |
| | | | | 370/346 |
| 2012/0155265 | A1* | 6/2012 | Ballani | H04L 47/805 |
| | | | | 370/235 |
| 2014/0219087 | A1* | 8/2014 | Matthews | H04L 47/28 |
| | | | | 370/231 |
| 2016/0301601 | A1* | 10/2016 | Anand | H04L 69/22 |
| 2017/0134538 | A1* | 5/2017 | Mahkonen | H04L 69/22 |
| 2017/0324652 | A1* | 11/2017 | Lee | H04L 47/2458 |
| 2018/0115493 | A1* | 4/2018 | Van Leekwijck | H04L 47/522 |
| 2018/0132189 | A1 | 5/2018 | Sundararajan et al. | |
| 2019/0104090 | A1* | 4/2019 | Labonte | H04L 47/2441 |
| 2019/0215263 | A1* | 7/2019 | Lee | H04L 69/22 |
| 2020/0162582 | A1* | 5/2020 | McCarthy | H04L 47/283 |
| 2021/0105762 | A1 | 4/2021 | Pezeshki et al. | |
| 2022/0109710 | A1* | 4/2022 | Danilov | H04L 65/61 |

* cited by examiner

TECHNIQUES FOR DEADLINE-AWARE SCHEDULING

FIELD OF TECHNOLOGY

The following relates to wireless communications, including techniques for deadline-aware scheduling (DAS).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Wireless communications systems may utilize different scheduling configurations for scheduling communications between the network and UEs, including "proportional fair (PF)" and "round robin (RR)" scheduling configurations. However, these techniques may be deficient in that they do not take into account packet expiration information at the UE, which may result in dropped packets, and increased latency.

SUMMARY

The described techniques relate to improved methods, systems, devices, and apparatuses that support techniques for deadline-aware scheduling (DAS). Generally, aspects of the present disclosure provide techniques which enable user equipments (UEs) to signal packet expiration times (e.g., packet deadline information) to the network. In particular, aspects of the present disclosure support techniques for signaling packet expiration time to the network, which may enable the network to perform DAS. For example, a UE may generate a set of data packets, where each data packet is associated with a packet expiration time. The UE may then transmit expiration information to the base station, where the packet expiration information is calculated based on the packet expiration times (e.g., calculated as a minimum, maximum, median, mean of the packet expiration times). The UE may then receive scheduling information which is determined based on the packet expiration information, and may transmit the data packets in accordance with the scheduling information and the packet expiration times. As such, by enabling UEs to signal packet expiration information to the network, the network may be able to take packet deadline information into account when scheduling communications at the respective UEs, which may reduce dropped packets, decrease latency, improve resource utilization, and increase system capacity.

A method for wireless communication at a UE is described. The method may include generating a set of multiple data packets that are to be transmitted to a base station, where each data packet of the set of multiple data packets is associated with a respective packet expiration time, transmitting, to the base station, an indication of packet expiration information associated with the set of multiple data packets, where the packet expiration information is based on a set of multiple packet expiration times associated with the set of multiple data packets, receiving, from the base station, scheduling information associated with at least a subset of the set of multiple data packets, where the scheduling information is based on the packet expiration information, and transmitting at least one data packet of the subset of the set of multiple data packets to the base station in accordance with the scheduling information.

An apparatus for wireless communication at a UE is described. The apparatus may include a processor, memory coupled with the processor, and instructions stored in the memory. The instructions may be executable by the processor to cause the apparatus to generate a set of multiple data packets that are to be transmitted to a base station, where each data packet of the set of multiple data packets is associated with a respective packet expiration time, transmit, to the base station, an indication of packet expiration information associated with the set of multiple data packets, where the packet expiration information is based on a set of multiple packet expiration times associated with the set of multiple data packets, receive, from the base station, scheduling information associated with at least a subset of the set of multiple data packets, where the scheduling information is based on the packet expiration information, and transmit at least one data packet of the subset of the set of multiple data packets to the base station in accordance with the scheduling information.

Another apparatus for wireless communication at a UE is described. The apparatus may include means for generating a set of multiple data packets that are to be transmitted to a base station, where each data packet of the set of multiple data packets is associated with a respective packet expiration time, means for transmitting, to the base station, an indication of packet expiration information associated with the set of multiple data packets, where the packet expiration information is based on a set of multiple packet expiration times associated with the set of multiple data packets, means for receiving, from the base station, scheduling information associated with at least a subset of the set of multiple data packets, where the scheduling information is based on the packet expiration information, and means for transmitting at least one data packet of the subset of the set of multiple data packets to the base station in accordance with the scheduling information.

A non-transitory computer-readable medium storing code for wireless communication at a UE is described. The code may include instructions executable by a processor to generate a set of multiple data packets that are to be transmitted to a base station, where each data packet of the set of multiple data packets is associated with a respective packet expiration time, transmit, to the base station, an indication of packet expiration information associated with the set of multiple data packets, where the packet expiration information is based on a set of multiple packet expiration times associated with the set of multiple data packets, receive, from the base station, scheduling information associated with at least a subset of the set of multiple data packets, where the scheduling information is based on the packet expiration information, and transmit at least one data packet of the subset of the set of multiple data packets to the base station in accordance with the scheduling information.

Some examples of the method, apparatuses, and non-transitory computer-readable medium described herein may further include operations, features, means, or instructions for receiving, from the base station, control signaling including an indication of a periodicity associated with a set of multiple transmission occasions for communicating the packet expiration information, where the indication of the packet expiration information may be transmitted in accordance with the indicated periodicity and within a transmission occasion of the set of multiple transmission occasions.

Some examples of the method, apparatuses, and non-transitory computer-readable medium described herein may further include operations, features, means, or instructions for receiving, from the base station, control signaling including an indication of one or more trigger conditions for communicating the packet expiration information, where transmitting the indication of the packet expiration information may be based on a satisfaction of the one or more trigger conditions.

In some examples of the method, apparatuses, and non-transitory computer-readable medium described herein, the satisfaction of the one or more trigger conditions may be based on a packet expiration time of the set of multiple packet expiration times satisfying a duration threshold, a change in the packet expiration information satisfying some change threshold, a quality of service (QoS) requirement at the UE satisfying a threshold quality, a processing capability of the UE satisfying a processing capability threshold, or any combination thereof.

Some examples of the method, apparatuses, and non-transitory computer-readable medium described herein may further include operations, features, means, or instructions for receiving, from the base station, a request for the packet expiration information, where the indication of the packet expiration information may be transmitted in response to the request.

In some examples of the method, apparatuses, and non-transitory computer-readable medium described herein, the request may be received via a downlink control information (DCI) message, a medium access control-control element (MAC-CE) message, or both.

Some examples of the method, apparatuses, and non-transitory computer-readable medium described herein may further include operations, features, means, or instructions for determining the packet expiration information in accordance with a packet expiry configuration, the packet expiry configuration including one or more mathematical operations for determining the packet expiration information based on the set of multiple packet expiration times.

Some examples of the method, apparatuses, and non-transitory computer-readable medium described herein may further include operations, features, means, or instructions for receiving, from the base station, a control message indicating the packet expiry configuration, where determining the packet expiration information may be based on receiving the control message.

Some examples of the method, apparatuses, and non-transitory computer-readable medium described herein may further include operations, features, means, or instructions for receiving, from the base station, additional control signaling indicating a set of multiple packet expiry configurations including the packet expiry configuration, where the control message may be received based on receiving the additional control signaling, and where determining the packet expiration information may be based on receiving the additional control signaling.

In some examples of the method, apparatuses, and non-transitory computer-readable medium described herein, determining the packet expiration information in accordance with the packet expiry configuration may include operations, features, means, or instructions for determining an average of the set of multiple packet expiration times, a median of the set of multiple packet expiration times, a minimum of the set of multiple packet expiration times, a maximum of the set of multiple packet expiration times, or any combination thereof.

In some examples of the method, apparatuses, and non-transitory computer-readable medium described herein, transmitting the at least one data packet of the set of multiple data packets may include operations, features, means, or instructions for identifying that a first data packet of the set of multiple data packets may be valid based on the scheduling information and a first packet expiration time corresponding to the first data packet and transmitting the first data packet based on identifying that the first data packet may be valid, where the at least one transmitted data packet includes the first data packet.

Some examples of the method, apparatuses, and non-transitory computer-readable medium described herein may further include operations, features, means, or instructions for identifying that a second data packet of the set of multiple data packets may be expired based on the scheduling information and a second packet expiration time corresponding to the second data packet and refraining from transmitting the second data packet based on identifying that the second data packet may be expired.

Some examples of the method, apparatuses, and non-transitory computer-readable medium described herein may further include operations, features, means, or instructions for discarding the second data packet from a transmission buffer at the UE based on identifying that the second data packet may be expired, where refraining from transmitting the second data packet may be based on discarding the second data packet.

In some examples of the method, apparatuses, and non-transitory computer-readable medium described herein, the indication of the packet expiration information may be transmitted via an uplink control information (UCI) message, a MAC-CE message, or both.

A method for wireless communication at a base station is described. The method may include receiving, from a UE, an indication of packet expiration information associated with a set of multiple data packets generated by the UE, where the packet expiration information is based on a set of multiple packet expiration times associated with the set of multiple data packets, transmitting, to the UE, scheduling information associated with at least a subset of the set of multiple data packets, where the scheduling information is based on the packet expiration information, and receiving at least one data packet of the subset of the set of multiple data packets from the UE in accordance with the scheduling information.

An apparatus for wireless communication at a base station is described. The apparatus may include a processor, memory coupled with the processor, and instructions stored in the memory. The instructions may be executable by the processor to cause the apparatus to receive, from a UE, an indication of packet expiration information associated with a set of multiple data packets generated by the UE, where the packet expiration information is based on a set of multiple packet expiration times associated with the set of multiple data packets, transmit, to the UE, scheduling information associated with at least a subset of the set of multiple data packets, where the scheduling information is based on the packet expiration information, and receive at least one data packet of the subset of the set of multiple data packets from the UE in accordance with the scheduling information.

Another apparatus for wireless communication at a base station is described. The apparatus may include means for receiving, from a UE, an indication of packet expiration information associated with a set of multiple data packets generated by the UE, where the packet expiration information is based on a set of multiple packet expiration times associated with the set of multiple data packets, means for transmitting, to the UE, scheduling information associated with at least a subset of the set of multiple data packets, where the scheduling information is based on the packet expiration information, and means for receiving at least one data packet of the subset of the set of multiple data packets from the UE in accordance with the scheduling information.

A non-transitory computer-readable medium storing code for wireless communication at a base station is described. The code may include instructions executable by a processor to receive, from a UE, an indication of packet expiration information associated with a set of multiple data packets generated by the UE, where the packet expiration information is based on a set of multiple packet expiration times associated with the set of multiple data packets, transmit, to the UE, scheduling information associated with at least a subset of the set of multiple data packets, where the scheduling information is based on the packet expiration information, and receive at least one data packet of the subset of the set of multiple data packets from the UE in accordance with the scheduling information.

Some examples of the method, apparatuses, and non-transitory computer-readable medium described herein may further include operations, features, means, or instructions for determining a DAS metric associated with the UE based on the packet expiration information, an instantaneous achievable data rate at the UE, an average throughput at the UE, or any combination thereof, where transmitting the scheduling information may be based on the DAS metric.

Some examples of the method, apparatuses, and non-transitory computer-readable medium described herein may further include operations, features, means, or instructions for receiving feedback information from the UE, where the instantaneous achievable data rate, the average throughput, or both, may be based on the feedback information.

In some examples of the method, apparatuses, and non-transitory computer-readable medium described herein, receiving the indication of the packet expiration information may include operations, features, means, or instructions for receiving an indication of packet expiration information associated with a set of multiple UEs including the UE and determining a set of multiple DAS metrics associated with the set of multiple UEs based on received packet expiration information corresponding to each UE of the set of multiple UEs, where transmitting the scheduling information may be based on the set of multiple DAS metrics.

Some examples of the method, apparatuses, and non-transitory computer-readable medium described herein may further include operations, features, means, or instructions for transmitting, to the UE, control signaling including an indication of a periodicity associated with a set of multiple transmission occasions for communicating the packet expiration information, where the indication of the packet expiration information may be received in accordance with the indicated periodicity and within a transmission occasion of the set of multiple transmission occasions.

Some examples of the method, apparatuses, and non-transitory computer-readable medium described herein may further include operations, features, means, or instructions for transmitting, to the UE, control signaling including an indication of one or more trigger conditions for communicating the packet expiration information, where receiving the indication of the packet expiration information may be based on a satisfaction of the one or more trigger conditions.

In some examples of the method, apparatuses, and non-transitory computer-readable medium described herein, the satisfaction of the one or more trigger conditions may be based on a packet expiration time of the set of multiple packet expiration times satisfying a duration threshold, a change in the packet expiration information satisfying some change threshold, a QoS requirement at the UE satisfying a threshold quality, a processing capability of the UE satisfying a processing capability threshold, or any combination thereof.

Some examples of the method, apparatuses, and non-transitory computer-readable medium described herein may further include operations, features, means, or instructions for transmitting, to the UE, a request for the packet expiration information, where the indication of the packet expiration information may be received in response to the request.

In some examples of the method, apparatuses, and non-transitory computer-readable medium described herein, the request may be transmitted via a DCI message, a MAC-CE message, or both.

Some examples of the method, apparatuses, and non-transitory computer-readable medium described herein may further include operations, features, means, or instructions for transmitting, to the UE, a control message indicating a packet expiry configuration, where the packet expiration information may be determined in accordance with the packet expiry configuration, the packet expiry configuration including one or more mathematical operations for determining the packet expiration information based on the set of multiple packet expiration times.

Some examples of the method, apparatuses, and non-transitory computer-readable medium described herein may further include operations, features, means, or instructions for transmitting, to the UE, additional control signaling indicating a set of multiple packet expiry configurations including the packet expiry configuration, where the control message may be transmitted based on transmitting the additional control signaling.

In some examples of the method, apparatuses, and non-transitory computer-readable medium described herein, the indication of the packet expiration information may be received via a UCI message, a MAC-CE message, or both.

DETAILED DESCRIPTION

Figure 1:
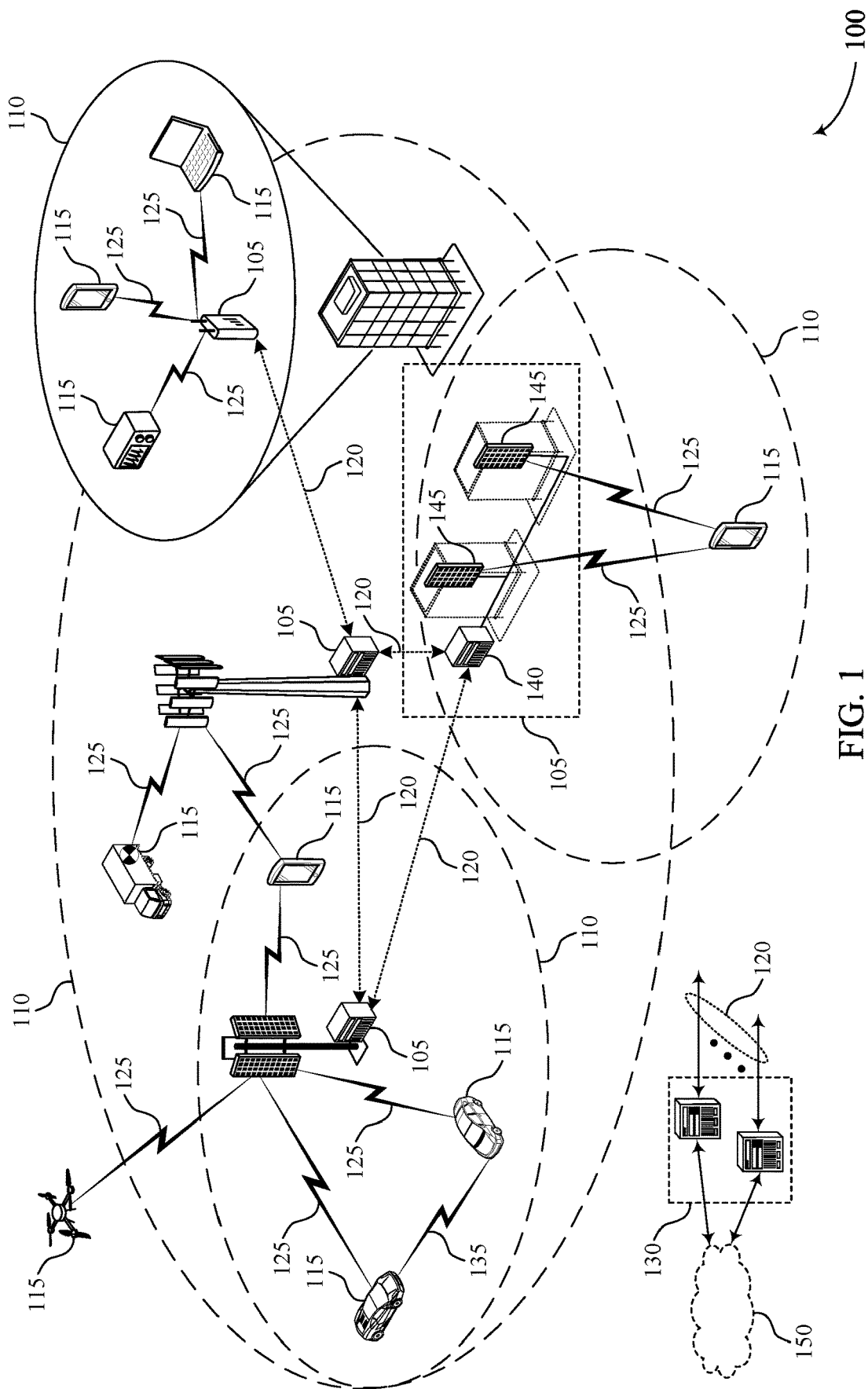
FIG. 1 illustrates an example of a wireless communications system that supports techniques for deadline-aware scheduling (DAS) in accordance with aspects of the present disclosure.

Wireless communications systems may utilize different scheduling configurations for scheduling communications between the network and user equipments (UEs), including "proportional fair (PF)" and "round robin (RR)" scheduling configurations. For example, using a PF scheduling configuration, a base station may schedule communications at UEs based on an average throughput and an instantaneous achievable data rate for each respective UE. However, conventional wireless communications systems do not support "deadline-aware scheduling" (DAS) configurations which take into account deadline information (e.g., expiration information) of data packets at the UE. In particular, data packets generated by a UE may be associated with packet expiration times, which indicate a duration of time in which each respective data packet is valid and must be sent before the data packet becomes expired and is "dropped." Without taking packet expiration information at UEs into account, conventional scheduling techniques may result in large quantities of data packets being dropped by the UEs, which may lead to increased latency and wasted communications resources.

Accordingly, aspects of the present disclosure are directed to techniques which enable UEs to signal packet expiration times (e.g., packet deadline information) to the network. In particular, aspects of the present disclosure support techniques for signaling packet expiration time to the network, which may enable the network to perform DAS. For the purposes of the present disclosure, the term "DAS" may be used to refer to configurations and techniques for scheduling wireless communications which take into account packet expiration times (e.g., packet deadline information).

For example, a UE may generate a set of data packets, where each data packet is associated with a packet expiration time. The UE may then transmit expiration information to the base station, where the packet expiration information is calculated based on the packet expiration times (e.g., calculated as a minimum, maximum, median, mean of the packet expiration times). The UE may then receive scheduling information which is determined based on the packet expiration information, and may transmit the data packets in accordance with the scheduling information and the packet expiration times. As such, by enabling UEs to signal packet expiration information to the network, the network may be able to take packet deadline information into account when scheduling communications at the respective UEs, which may reduce dropped packets, decrease latency, and improve resource utilization.

In some cases, the UE may be configured to transmit packet expiration information in response to a request from the base station, periodically within pre-configured transmission occasions, and/or aperiodically based on some trigger condition (e.g., significant change in packet expiration information). The UE may calculate the packet expiration information based on the packet expiration times using a "packet expiry configuration," which may be pre-configured at the UE, signaled to the UE via radio resource control (RRC) and/or downlink control information (DCI) signaling, or both. Moreover, the network may be configured to calculate a DAS metric for each UE based on packet expiration information received from each UE and other characteristics (e.g., average throughput, instantaneous achievable data rate), and may rank and schedule the UEs based on their corresponding DAS metrics.

Aspects of the disclosure are initially described in the context of wireless communications systems. Additional aspects of the disclosure are described in the context of an example process flow. Aspects of the disclosure are further illustrated by and described herein with reference to apparatus diagrams, system diagrams, and flowcharts that relate to techniques for DAS.

FIG. 1 illustrates an example of a wireless communications system 100 that supports techniques for DAS in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a geographic coverage area 110 over which the UEs 115 and the base station 105 may establish one or more communication links 125. The geographic coverage area 110 may be an example of a geographic area over which a base station 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta/f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described herein with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some aspects, the UEs 115, base stations 105, and other wireless devices of the wireless communications system 100 may support techniques which enable UEs 115 and other wireless devices (e.g., IAB nodes) to signal packet expiration times (e.g., packet deadline information) to the network. In particular, the wireless devices of the wireless communications system 100 may support techniques for signaling packet expiration time to the network, which may enable the network to perform DAS.

For example, a UE 115 of the wireless communications system 100 may generate a set of data packets (e.g., data packets to be transmitted to a base station 105), where each data packet is associated with a packet expiration time. The UE 115 may then transmit expiration information to the base station, where the packet expiration information is calculated based on the packet expiration times (e.g., calculated as a minimum, maximum, median, mean of the packet expiration times). The UE 115 may then receive scheduling information which is determined based on the packet expiration information, and may transmit the data packets in accordance with the scheduling information and the packet expiration times. As such, by enabling UEs 115 to signal packet expiration information to the network, the network may be able to take packet deadline information into account when scheduling communications at the respective UEs 115, which may reduce dropped packets, decrease latency, and improve resource utilization.

In some cases, the UE 115 may be configured to transmit packet expiration information in response to a request from the base station, periodically within pre-configured transmission occasions, and/or aperiodically based on some trigger condition (e.g., significant change in packet expiration information). The UE 115 may calculate the packet expiration information based on the packet expiration times using a "packet expiry configuration," which may be preconfigured at the UE 115, signaled to the UE 115 via RRC and/or DCI signaling, or both. Moreover, the network may be configured to calculate a DAS metric for each UE 115 based on packet expiration information received from each UE 115 and other characteristics (e.g., average throughput, instantaneous achievable data rate), and may rank and schedule the UEs 115 based on their corresponding DAS metrics.

Techniques described herein may enable the wireless communications system 100 to support DAS. In particular, by enabling UEs 115 to indicate packet expiration information (e.g., packet deadline information) to the base station 105, techniques described herein may enable the base station 105 to take the packet expiration information for each respective UE 115 into account when scheduling wireless communications at the respective UEs 115, which may reduce a quantity and/or frequency of dropped packets at the respective UEs 115. Moreover, by reducing a quantity and frequency of dropped packets, techniques described herein may reduce a latency of wireless communications, and may lead to more efficient scheduling and a more efficient use of wireless resources. Further, by reducing a quantity and frequency of dropped packets, techniques described herein may improve system capacity within the wireless communications system 100 by enabling the network to support larger quantities of UEs 115 within a given cell.

Figure 2:
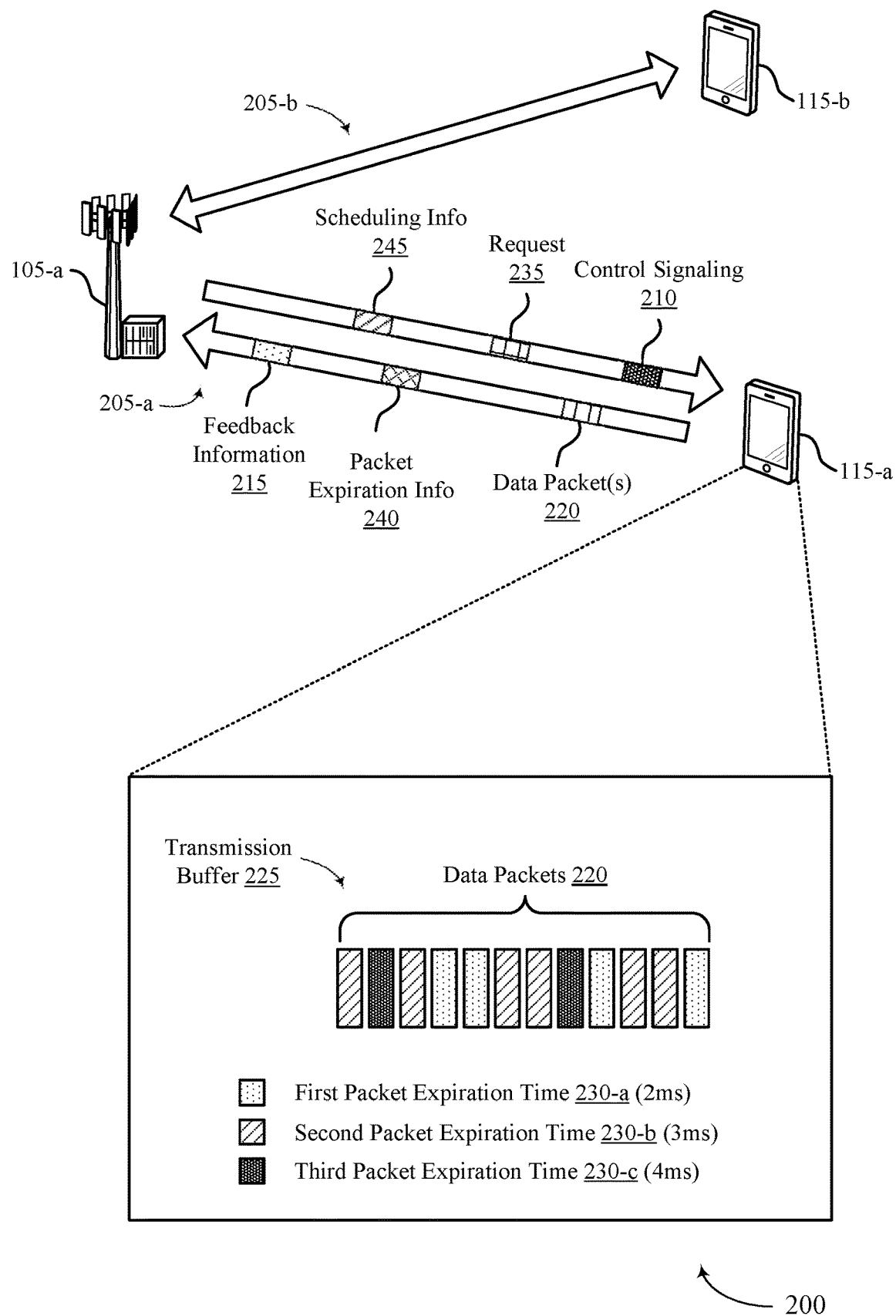
FIG. 2 illustrates an example of a wireless communications system that supports techniques for DAS in accordance with aspects of the present disclosure.

FIG. 2 illustrates an example of a wireless communications system 200 that supports techniques for DAS in accordance with aspects of the present disclosure. In some examples, wireless communications system 200 may implement, or be implemented by, aspects of wireless communications system 100. The wireless communications system 200 may include a base station 105-*a*, a first UE 115-*a*, and a second UE 115-*b*, which may be examples of base stations 105 and UEs 115 described herein with reference to FIG. 1.

Each of the UEs 115-*a*, 115-*b* may communicate with the base station 105-*a* using one or more communication links 205. For example, the first UE 115-*a* may communicate with the base station 105-*a* via a communication link 205-*a*, and the second UE 115-*b* may communicate with the base station 105-*b* via a communication link 205-*b*. In some cases, the communication links 205-*a*, 205-*b* may include examples of access links (e.g., Uu links). The communication links 205-*a*, 205-*b* may include bi-directional links that can include both uplink and downlink communication. For example, the first UE 115-*a* may transmit uplink transmissions, such as uplink control signals or uplink data signals, to the base station 105-*a* via communication link 205-*a*, and the base station 105-*a* may transmit downlink transmissions, such as downlink control signals or downlink data signals, to the first UE 115-*a* via the communication link 205-*a*.

As noted previously herein, wireless communications systems may utilize different scheduling configurations for scheduling communications between the network and UEs 115, including PF scheduling configurations and RR scheduling configurations. In particular, according to some scheduling configurations, UEs 115 may be scheduled to transmit and/or receive within respective transmission time intervals (TTIs), where the base station 105 schedules one UE 115 for each respective TTI. Different scheduling configurations may schedule wireless communications based on different scheduling metrics. For example, using a PF scheduling configuration, a base station may schedule communications at UEs 115 based on an average throughput (e.g., average throughput for past T period) and an instantaneous achievable data rate (e.g., instantaneous achievable data rate at the current time/current TTI) for each respective UE 115.

However, conventional wireless communications systems do not support DAS configurations which take into account deadline information (e.g., expiration information) of data packets at each respective UE 115. In other words, some scheduling configurations implemented by some wireless communications systems do not take into account remaining times to packet expiry for data packets generated at the respective UEs 115. Data packets with a deadline (e.g., packets with a packet expiration time) which are not transmitted (or received) by the deadline will be dropped. For the purposes of the present disclosure, to data packet may be said to be "dropped" if the data packet is removed from a transmission buffer (e.g., not transmitted), not successfully received by the receiver, ignored or otherwise disregarded by the receiver, or any combination thereof. As such, wireless communications systems which do not take into account packet expiration information at a UE 115 may schedule wireless communications which are inconsistent with the packet expiration information (e.g., schedule data packets after they are already expired), which may result in a higher proportion and/or higher frequency of dropped data packets. F Accordingly, the UEs 115-*a*, 115-*b* and the base station 105-*a* of the wireless communications system 200 may support techniques which enable the UEs 115 to signal packet expiration information to the base station 105-*a*, which may enable the base station 105-*a* to perform DAS. By signaling packet expiration information to the base station 105-*a*, techniques described herein may enable the base station 105-*a* to take the packet expiration information into account when scheduling wireless communications at each of the respective UEs 115-*a*, 115-*b*, which may reduce a quantity/frequency of dropped data packets, reduce latency, and improve resource utilization.

For example, as shown in FIG. 2, the base station 105-*a* may transmit control signaling 210 to the first UE 115-*a*, the second UE 115-*b*, or both. The control signaling 210 may include RRC signaling, synchronization signal block (SSB) signaling, DCI messaging, MAC-CE messaging, and the like. In some aspects, the control signaling 210 may include information associated with reporting packet expiration information 240 associated with data packets 220 within a transmission buffer 225 of each respective UE 115. In this regard, the control signaling 210 may indicate resources for reporting packet expiration information 240, trigger conditions for reporting packet expiration information 240, packet expiry configurations usable by the UEs 115 for calculating packet expiration information 240, or any combination thereof.

For example, in some cases, the control signaling 210 may indicate resources (e.g., time resources, frequency resources, spatial resources) usable by the UEs 115 for reporting packet expiration information 240 to the base station 105-*a*. In this regard, the control signaling 210 may schedule uplink messages including packet expiration information 240. For instance, the control signaling 210 may indicate a set of transmission occasions for transmitting packet expiration information 240 to the base station 105-*a*. In this example, the control signaling 210 may indicate a periodicity associated with the set of transmission occasions. In other cases, the transmission occasions may be associated with an irregular periodicity.

By way of another example, the control signaling 210 may indicate a set of trigger conditions for reporting packet expiration information 240. In other words, the base station 105-*a* may configure the UEs 115 with a set of trigger conditions that, if satisfied, trigger the UEs 115 to transmit packet expiration information 240 associated with data packets 220 generated by the respective UEs 115. Trigger conditions may be associated with any number of parameters or characteristics associated with the UEs 115 and/or the wireless communications system 200, including durations of packet expiration times 230 associated with data packets 220 generated by the UEs 115, changes in packet expiration information 240 determined by the respective UEs 115, quality of service (QoS) requirements at the UEs 115, processing capabilities of the UEs 115, or any combination thereof.

In some aspects, the control signaling 210 may indicate one or more packet expiry configurations for calculating packet expiration information 240 at the UEs 115. Each packet expiry configuration may define a set of rules or mathematical operations which may be used to calculate packet expiration information 240 based on data packets 220 within a transmission buffer 225 at each respective UE 115. In this regard, the base station 105-*a* may configure the UEs 115 with one or more packet expiry configurations which may be used to calculate packet expiration information 240 based on packet expiration times 230 of generated data packets 220. In additional or alternative implementations, the UEs 115 may be configured (e.g., pre-configured) with one or more packet expiry configurations, and may therefore be enabled to calculate packet expiration information 240 without explicit indications of packet expiry configurations from the base station 105-*a*.

As will be described in further detail herein, the base station 105-*a* may calculate DAS metrics for each respective UE 115 in order to facilitate DAS. DAS metrics calculated by the base station 105-*a* may be based on any number of parameters or characteristics, including packet expiration information 240 for each UE 115 ("e"), an instantaneous achievable data rate for the current TTI ("r"), and an average throughput of each UE 115 for the past T TTIs ("a"), and such, each DAS metric may be a function of e, r, and a (e.g., DASMetric=f (r, a, e)). In some cases, r and a may be estimated/calculated by the base station 105-*a*, where e (e.g., packet expiration information 240) may have to be reported by the UEs 115.

In some implementations, the first UE 115-*a*, the second UE 115-*b*, or both, may transmit feedback information 215 to the base station 105-*a*. In some cases, the feedback information 215 may be responsive to the control signaling 210. In additional or alternative implementations, the UEs 115 may transmit the feedback information 215 based on (in response to) other signaling received from the base station 105-*a*. The feedback information 215 may include, but is not limited to, modulation and coding scheme (MCS) feedback information, CSI-RS feedback, and the like.

In some aspects, the feedback information 215 may include information which enables the base station 105-*a* to determine DAS metrics for the respective UEs 115. For example, in some implementations, the feedback information 215 may indicate (or may enable the base station 105-*a* to calculate/estimate) an average throughput (e.g., a) and/or an instantaneous achievable data rate (e.g., r) for each respective UE 115. In such cases, the feedback information 215 (e.g., average throughput, instantaneous achievable data rate) may enable the base station 105-*a* to determine DAS metrics for each respective UE 115, which may facilitate DAS at the base station 105-*a*.

The first UE 115-*a*, the second UE 115-*b*, or both, may generate data packets 220. Data packets 220 generated by each UE 115 may be contained or otherwise included within a transmission buffer 225 (e.g., data buffer, data packet buffer) for each respective UE 115. For example, as shown and described in FIG. 2, the first UE 115-*a* may generate a set of data packets 220 which are to be transmitted to the base station 105-*a*, where the data packets 220 are stored in a transmission buffer 225 of the first UE 115-*a*.

In some aspects, data packets 220 generated by the UEs 115 may be associated with different deadline information. In other words, each generated data packet 220 may be associated with a respective packet expiration time 230. For example, as shown in FIG. 2, data packets 220 generated by the first UE 115-*a* may be associated with a packet expiration time 230-*a* (e.g., 2 ms), a second packet expiration time 230-*b* (e.g., 3 ms), or a third packet expiration time 230-*c* (e.g., 3 ms). Each where the packet expiration time 230 indicates a time interval or duration in which the respective data packet 220 is valid (e.g., time interval/duration until the respective data packet is dropped). For example, a data packet 220 associated with the first packet expiration time 230-*a* may have to be transmitted within 2 ms of being generated before the data packet 220 is dropped (e.g., 2 ms before the data packet 220 is removed from the transmission buffer 225).

In some cases, packet expiration times 230 may be associated with a relative priority of the respective data packet 220. For example, in some cases, higher priority data packets 220 may be associated with smaller/shorter packet expiration times 230, whereas lower priority data packets 220 may be associated with larger/longer packet expiration times 230.

In some aspects, the base station 105-*a* may transmit a request 235 to the first UE 115-*a*, the second UE 115-*b*, or both, where the request 235 includes a request 235 for packet expiration information 240 associated with the respective UEs 115. The request 235 may include a DCI message, a MAC-CE message, or both. In some aspects, the request 235 may indicate a set of resources for transmitting packet expiration information 240 to the base station 105-*a*. In this regard, resources for reporting packet expiration information 240 may be indicated via the control signaling 210, the request 235 (e.g., DCI, MAC-CE), or both.

In some aspects, the first UE 115-*a*, the second UE 115-*b*, or both, may determine packet expiration information 240 (e.g., values of e for calculating DAS metrics) associated with the respective UEs 115. Each of the UEs 115 may determine the packet expiration information 240 for the respective UEs 115 based on receiving the control signaling 210, transmitting the feedback information 215, generating the data packets 220, receiving the request 235, or any combination thereof. For example, in some implementations, the first UE 115-*a* may determine packet expiration information 240 for the first UE 115-*a* based on receiving the request 235.

In some aspects, the UEs 115 may determine packet expiration information 240 (e.g., values of e for calculating DAS metrics) corresponding to the respective UEs 115 in accordance with one or more packet expiry configurations. Packet expiry configurations may be signaled to the UEs 115 by the network, pre-configured at the UEs 115, or both. For example, in some cases, the first UE 115-*a* may determine packet expiration information 240 in accordance with a packet expiry configuration which was indicated via the control signaling 210. In cases where the control signaling 210 indicated multiple packet expiry configurations, subsequent signaling from the base station 105-*a* may dynamically indicate which packet expiry configuration is to be used. For example, the control signaling 210 may include RRC signaling which indicates multiple packet expiry configurations. In this example, the request 235 and/or other control signaling 210 (e.g., other DCI message, other MAC-CE message) may indicate or select which of the packet expiry configurations is to be used.

There may be multiple potential packet expiry configuration options which may be used to determine/characterize remaining time to packet expiry information for each UE 115. In other words, there may be multiple options for determining/characterizing the value of e (e.g., packet expiration information 240) which will be used to determine DAS metrics for the respective UEs 115. In particular, each packet expiry configuration may indicate rules, mathematical operations, or both, for determining packet expiration information 240 based on packet expiration times 230 of generated data packets 220. In this regard, packet expiration information 240 may be determined using any number of mathematical operations, including an average/mean, median, maximum, minimum, and the like.

For example, in some implementations, the first UE 115-*a* may determine packet expiration information 240 in accordance with an indicated/configured packet expiry configuration by determining an average remaining time to packet expiry of all packets in queue at the UE 115-*a*. For instance, in accordance with a first packet expiry configuration, the first UE 115-*a* may determine an average packet expiration time across all data packets 220 within the transmission buffer 225. In this example, the packet expiration information 240 may be determined as 2.83 ms (e.g., e=(2 ms*4)+(3 ms*6)+(4 ms*2)/12=2.83 ms).

In accordance with a second packet expiry configuration, the first UE 115-a may determine the packet expiration information 240 as a median packet expiration time of all data packets 220 in the transmission buffer 225 (e.g., e=median{remaining time to expiry}). For instance, in accordance with the second packet expiry configuration, the first UE 115-a may determine the packet expiration information 240 to be 3 ms (e.g., e=median{2,2,2,2,3,3,3,3,3,3,4,4}=3 ms).

In accordance with a third packet expiry configuration, the first UE 115-a may determine the packet expiration information 240 as a maximum packet expiration time of all data packets 220 in the transmission buffer 225 (e.g., e=max{remaining time to expiry}). For instance, in accordance with the third packet expiry configuration, the first UE 115-a may determine the packet expiration information 240 to be 4 ms (e.g., e=max{2,2,2,2,3,3,3,3,3,3,4,4}=4 ms).

Comparatively, in accordance with a fourth packet expiry configuration, the first UE 115-a may determine the packet expiration information 240 as a minimum packet expiration time of all data packets 220 in the transmission buffer 225 (e.g., e=min{remaining time to expiry}). For instance, in accordance with the fourth packet expiry configuration, the first UE 115-a may determine the packet expiration information 240 to be 4 ms (e.g., e=min{2,2,2,2,3,3,3,3,3,3,4,4}=2 ms). It is noted herein that the packet expiration information 240 (e.g., value of e) may be calculated using any number or type of mathematical operation or function (e.g., e=f (remaining time to expiry of each packet in queue)).

In some aspects, the first UE 115-a, the second UE 115-b, or both, may identify a satisfaction of one or more trigger conditions for reporting packet expiration information 240. In other words, the UEs 115 may identify a satisfaction of one or more trigger conditions for aperiodically reporting packet expiration information 240. The UEs 115 may identify a satisfaction of a trigger condition for reporting packet expiration information 240 which were configured via the control signaling 210 and/or the request 235. In this regard, the UEs 115 may identify the satisfaction of the trigger condition(s) based on receiving the control signaling 210, transmitting the feedback information 215, generating the data packets 220, receiving the request 235, determining the packet expiration information 240, or any combination thereof.

Trigger conditions for reporting packet expiration information 240 may be associated with any number of parameters or characteristics associated with the UEs 115 and/or the wireless communications system, including durations of packet expiration times 230 associated with data packets 220 generated by the UEs 115, changes in packet expiration information 240 determined by the respective UEs 115, QoS requirements at the UEs 115, processing capabilities of the UEs 115, or any combination thereof.

For example, in some cases, the first UE 115-a may identify a satisfaction of a trigger condition based on one or more packet expiration times 230 (PETs) at the first UE 115-a satisfying some duration threshold ($PET_{Thresh}$) (e.g., $PET \leq PET_{Thresh}$). By way of another example, the first UE 115-a may identify a satisfaction of a trigger condition/event based on a change in the packet expiration information 240 satisfying some change threshold (e.g., based on a significant change in determined packet expiration information 240 at the first UE 115-a). In other words, a change in the value of e at the UE 115 may trigger aperiodic reporting of e (e.g., aperiodic reporting of packet expiration information 240). By way of yet another example, the first UE 115-a may identify a satisfaction of a trigger condition based on a QoS requirement at the UE 115-a satisfying some threshold quality (e.g., $QoS \geq QoS_{Thresh}$), a processing capability of the first UE 115-a satisfying a processing capability threshold, or any combination thereof.

In some aspects, the first UE 115-a, the second UE 115-b, or both, may transmit packet expiration information 240 to the base station 105-a (e.g., report the value of e). In other words, the UEs 115 may transmit packet expiration information 240 which was determined by the respective UEs 115. In this regard, the UEs 115 may transmit the packet expiration information 240 based on receiving the control signaling 210, transmitting the feedback information 215, generating the data packets 220, receiving the request 235, determining the packet expiration information 240, identifying the satisfaction of a trigger condition(s), or any combination thereof. The UEs 115 may be configured to transmit indications of packet expiration information 240 via an uplink control information (UCI) message, a MAC-CE message, or both.

In some aspects, the UEs 115 may transmit the packet expiration information 240 within resources which were signaled/configured via the control signaling 210 and/or the request 235. For example, in cases where the control signaling 210 indicates a periodicity associated with a set of transmission occasions for reporting packet expiration information 240, the first UE 115-a may transmit the packet expiration information 240 within an indicated transmission occasion and in accordance with the indicated periodicity. In additional or alternative implementations, the UEs 115 may transmit the packet expiration information 240 in response to the request 235, in response to a satisfaction of one or more trigger conditions, or both. In this regard, the UEs 115 may be configured to transmit packet expiration information 240 periodically, aperiodically, or both.

Subsequently, the base station 105-a may be configured to determine DAS metrics for the first UE 115-a, the second UE 115-b, or both. In general, the base station 105-d may be configured to determine/calculate a DAS metric for each respective UE 115 which is served by the base station 105-a. For example, the base station 105-a may be configured to determine a first DAS metric for the first UE 115-a, and a second DAS metric for the second UE 115-b.

The base station 105-a may be configured to utilize received packet expiration information 240 and any number of other parameters or characteristics to determine a DAS metric for each respective UE 115. For example, in some implementations, the base station 105-a may determine a DAS metric for the first UE 115-a based on packet expiration information 240 for the first UE 115-a (e), an instantaneous achievable data rate at the first UE 115-a (r), an average throughput at the first UE 115-b (a), or any combination thereof.

For example, the base station 105-a may be configured to determine a DAS metric for the first UE 115-a in accordance with Equation 1:

$$DASMetric = A*(r/a) + B(e)$$

where e is the packet expiration information 240 reported by the first UE 115-a, r is the instantaneous achievable data rate of the first UE 115-a within the current TTI, A is the average throughput at the first UE 115-a across some quantity of past TTIs, and A and B are constants which are greater than zero. In this example, the base station 105-a may be configured to determine the instantaneous achievable data rate (r), the average throughput, or both, based on the feedback information 215 (e.g., MCS feedback, CSI-RS feedback) received from the first UE 115-a. Moreover, in the case of aperiodic reporting (e.g., reporting based on a satisfaction of a trigger condition/event), the base station 105-a may be configured to utilize a previously-reported value of e (e.g., previously reported packet expiration information 240) in order to calculate the DAS metric.

In some aspects, the base station 105-a may be configured to schedule wireless communications at the respective UEs 115 based on determined DAS metrics corresponding to each respective UE 115. In other words, the base station 105-a may be configured to rank or otherwise order UEs 115 based on (e.g., in accordance with) corresponding DAS metrics in order to prioritize scheduling and resource allocations provided to each respective UE 115.

The base station 105-a may transmit scheduling information 245 to the first UE 115-a, the second UE 115-b, or both. In particular, the base station 105-a may be configured to transmit the scheduling information 245 based on (e.g., in accordance with) the DAS metric(s) for the respective UEs 115. In this regard, the UEs 115 may receive the scheduling information 245 based on receiving the control signaling 210, transmitting the feedback information 215, generating the data packets 220, receiving the request 235, determining the packet expiration information 240, identifying the satisfaction of the trigger condition(s), transmitting the packet expiration information 240, the determination of the DAS metric(s) at the base station 105-a, or any combination thereof.

The scheduling information 245 may include grants or resource allocations for transmitting one or more of the data packets 220 generated at the respective UEs 115. In this regard, the scheduling information 245 may be communicated via any message, including a DCI message, a MAC-CE message, and the like. For example, the scheduling information 245 received by the first UE 115-a may schedule at least a subset of the data packets 220 generated by the first UE 115-a. In some implementations, the scheduling information 245 may indicate individual data packets 220 (or sets of data packets 220) which are to be transmitted. In additional or alternative implementations, the scheduling information 245 may include a grant of resources which may be used by the first UE 115-a to transmit any generated data packet(s).

The first UE 115-a, the second UE 115-b, or both, may determine whether one or more data packets 220 generated by the respective UEs 115 are valid. For example, the first UE 115-a may determine whether a generated data packet is valid based on the received scheduling information 245, the packet expiration time 230 corresponding to the generated data packet, or both. Subsequently, the first UE 115-a, the second UE 115-b, or both, may discard (e.g., drop) expired data packets 220. For example, the first UE 115-a, may be configured to drop an expired data packet from the transmission buffer 225 at the first UE 115-a based on identifying that the data packet is not valid (e.g., expired).

In some aspects, the first UE 115-a, the second UE 115-b, or both, may transmit at least one data packet 220 to the base station 105-a in accordance with the scheduling information 245 received by each respective UE 115. For example, the first UE 115-a may transmit at least one generated data packet 220 with time and frequency resources which were allocated to the first UE 115-a via the scheduling information 245.

In some implementations, the base station 105-a may be configured to activate/deactivate reporting of packet expiration information 240 (e.g., via MAC-CE and/or DCI signaling). The base station 105-a may be configured to activate/deactivate remaining time to packet expiry reporting based on UE 115 capabilities, traffic QoS requirements, channel conditions, and the like. Conversely, UEs 115 may be configured to request activation/deactivation of packet expiration information 240 reporting (e.g., via MAC-CE and/or UCI signaling) based on UE 115 capabilities, traffic QoS requirements, channel conditions, and the like.

Techniques described herein may enable the wireless communications system to support DAS. In particular, by enabling the UEs 115 to indicate packet expiration information 240 (e.g., packet deadline information) to the base station 105-a, techniques described herein may enable the base station 105-a to take the packet expiration information 240 for each respective UE 115 into account when scheduling wireless communications at the respective UEs 115, which may reduce a quantity and/or frequency of dropped packets at the respective UEs 115. Moreover, by reducing a quantity and frequency of dropped packets, techniques described herein may reduce a latency of wireless communications, and may lead to more efficient scheduling and a more efficient use of wireless resources.

Figure 3:
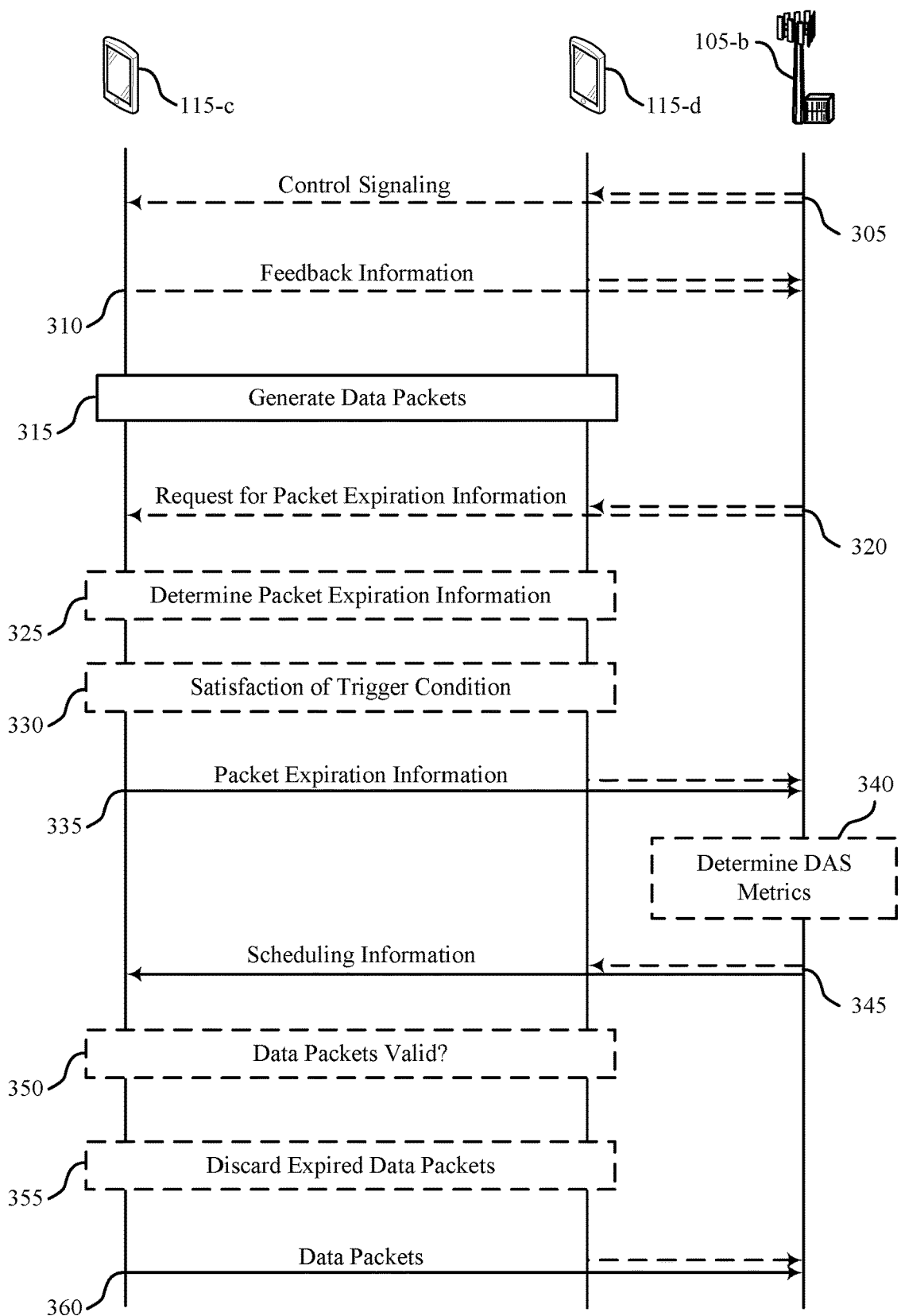
FIG. 3 illustrates an example of a process flow that supports techniques for DAS in accordance with aspects of the present disclosure.

FIG. 3 illustrates an example of a process flow 300 that supports techniques for DAS in accordance with aspects of the present disclosure. In some examples, process flow 300 may implement, or be implemented by, aspects of wireless communications system 100, wireless communications system 200, or both. In particular, the process flow 300 illustrates configurations and signaling which may support DAS. For example, the process flow 300 illustrates a UE 115-c transmitting packet expiration information associated with data packets generated at the UE 115-c, a base station determining DAS metrics for UEs 115 based on received packet expiration information, the UE 115-c receiving scheduling information based on the determined DAS metrics, and transmitting data packets in accordance with the received scheduling information, as described as described herein with reference to FIGS. 1-2, among other aspects.

The process flow 300 may include a first UE 115-c, a second UE 115-d, and a base station 105-b, which may be examples of UEs 115 and base stations 105 as described herein with reference to FIGS. 1-2. For example, the first UE 115-c and the base station 105-b illustrated in FIG. 3 may be examples of the first UE 115-a and the base station 105-a, respectively, as illustrated in FIG. 2.

In some examples, the operations illustrated in process flow 300 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 305, the base station 105-b may transmit control signaling to the first UE 115-c, the second UE 115-b, or both. The control signaling may include RRC signaling, SSB signaling, DCI messaging, MAC-CE messaging, and the like. In some aspects, the control signaling may include information associated with reporting packet expiration information to the base station 105-b, including resources for reporting packet expiration information, trigger conditions for reporting packet expiration information, packet expiry configurations usable by the UEs 115 for calculating packet expiration information, or any combination thereof.

For example, in some cases, the control signaling may indicate resources (e.g., time resources, frequency resources, spatial resources) usable by the UEs 115 for reporting packet expiration information to the base station 105-b. The control signaling may schedule uplink messages. For instance, the control signaling may indicate a set of transmission occasions for transmitting packet expiration information to the base station 105-b. In this example, the control signaling may indicate a periodicity associated with the set of transmission occasions (e.g., signaling period T). In other cases, the transmission occasions may be associated with an irregular periodicity.

By way of another example, the control signaling may indicate a set of trigger conditions for reporting packet expiration information. In other words, the base station 105-b may configure the UEs 115 with a set of trigger conditions that, if satisfied, trigger the UEs 115 to transmit packet expiration information associated with data packets generated by the respective UEs 115. Trigger conditions may be associated with any number of parameters or characteristics associated with the UEs 115 and/or the wireless communications system, including durations of packet expiration times associated with data packets generated by the UEs 115, changes in packet expiration information determined by the respective UEs 115, traffic QoS requirements at the UEs 115, processing capabilities of the UEs 115, channel conditions, or any combination thereof.

In some aspects, the control signaling may indicate one or more packet expiry configurations for calculating packet expiration information at the UEs 115. Each packet expiry configuration may define a set of rules or mathematical operations which may be used to calculate packet expiration information. In this regard, the base station 105-b may configure the UEs 115 with one or more packet expiry configurations which may be used to calculate packet expiration information. In additional or alternative implementations, the UEs 115 may be configured (e.g., pre-configured) with one or more packet expiry configurations, and may therefore be enabled to calculate packet expiration information without explicit indications of packet expiry configurations from the base station 105-b.

At 310, the first UE 115-c, the second UE 115-b, or both, may transmit feedback information to the base station 105-b. In some cases, the feedback information at 310 may be responsive to the control signaling. In additional or alternative implementations, the UEs 115 may transmit the feedback information based on (in response to) other signaling received from the base station 105-b. The feedback information may include, but is not limited to, MCS feedback information, CSI-RS feedback, and the like.

In some aspects, the feedback information may include information which enables the base station 105-b to determine DAS metrics for the respective UEs 115. For example, in some implementations, the feedback information may indicate (or may enable the base station 105-b to calculate) an average throughput and/or an instantaneous achievable data rate for each respective UE 115. In such cases, the feedback information (e.g., average throughput, instantaneous achievable data rate) may enable the base station 105-b to determine DAS metrics for each respective UE 115, which may facilitate DAS at the base station 105-b.

At 315, the first UE 115-c, the second UE 115-d, or both, may generate data packets. Data packets generated by each UE 115 may be contained or otherwise included within a transmission buffer (e.g., data buffer, data packet buffer) for each respective UE 115. For example, as shown and described in FIG. 2, the first UE 115-c may generate a set of data packets which are to be transmitted to the base station 105-b, where the data packets are stored in a transmission buffer of the first UE 115-c. In some aspects, data packets generated by the UEs 115 may be associated with a respective packet expiration time, where the packet expiration time indicates a time interval or duration in which the respective data packet is valid (e.g., time interval/duration until the respective data packet is dropped). In some cases, packet expiration times may be associated with a relative priority of the respective data packet. For example, in some cases, higher priority data packets may be associated with smaller/shorter packet expiration times, whereas lower priority data packets may be associated with larger/longer packet expiration times.

At 320, the base station 105-b may transmit a request to the first UE 115-c, the second UE 115-d, or both, where the request includes a request for packet expiration information associated with the respective UEs 115. The request may include a DCI message, a MAC-CE message, or both. In some aspects, the request may indicate a set of resources for transmitting packet expiration information to the base station 105-b. In this regard, resources for reporting packet expiration information may be indicated via the control signaling at 305, the request (e.g., DCI, MAC-CE) at 320, or both.

At 325, the first UE 115-c, the second UE 115-d, or both, may determine packet expiration information associated with the respective UEs 115. Each of the UEs 115 may determine the packet expiration information for the respective UEs 115 based on receiving the control signaling at 305, transmitting the feedback information at 310, generating the data packets at 315, receiving the request at 320, or any combination thereof. For example, in some implementations, the first UE 115-c may determine packet expiration information for the first UE 115-c based on receiving the request at 320. In this example, the packet expiration information for the first UE 115-c may be based on the data packets generated by the first UE 115-c at 315.

In some aspects, the UEs 115 may determine packet expiration information corresponding to the respective UEs 115 in accordance with one or more packet expiry configurations. Packet expiry configurations may be signaled to the UEs 115 by the network, pre-configured at the UEs 115, or both. For example, in some cases, the first UE 115-c may determine packet expiration information in accordance with a packet expiry configuration which was indicated via the control signaling at 305. In cases where the control signaling at 305 indicated multiple packet expiry configurations, subsequent signaling from the base station 105-b may dynamically indicate which packet expiry configuration is to be used. For example, the control signaling may include RRC signaling which indicates multiple packet expiry configurations. In this example, the request and/or other control signaling (e.g., other DCI message, other MAC-CE message) may indicate or select which of the packet expiry configurations is to be used.

As noted previously herein, packet expiry configurations may indicate rules, mathematical operations, or both, for determining packet expiry information based on packet expiration times of generated data packets. In this regard, packet expiration information may be determined using any number of mathematical operations, including an average/mean, median, maximum, minimum, and the like. For example, in some implementations, the first UE 115-c may determine packet expiration information in accordance with an indicated/configured packet expiry configuration by determining an average/mean packet expiration time of the generated data packets, a median packet expiration time of the generated data packets, a minimum or maximum packet expiration time of the generated data packets, or any combination thereof.

At 330, the first UE 115-c, the second UE 115-d, or both, may identify a satisfaction of one or more trigger conditions for reporting packet expiration information. In other words, the UEs 115 may identify a satisfaction of a trigger condition for reporting packet expiration information which were configured via the control signaling at 305 and/or the request at 320. In this regard, the UEs 115 may identify the satisfaction of the trigger condition(s) at 325 based on receiving the control signaling at 305, transmitting the feedback information at 310, generating the data packets at 315, receiving the request at 320, determining the packet expiration information at 325, or any combination thereof.

As noted previously herein, trigger conditions for reporting packet expiration information may be associated with any number of parameters or characteristics associated with the UEs 115 and/or the wireless communications system, including durations of packet expiration times associated with data packets generated by the UEs 115, changes in packet expiration information determined by the respective UEs 115, traffic QoS requirements at the UEs 115, processing capabilities of the UEs 115, channel conditions or any combination thereof.

For example, in some cases, the first UE 115-c may identify a satisfaction of a trigger condition based on one or more packet expiration times at the first UE 115-c satisfying some duration threshold (e.g., $PET \leq PET_{Thresh}$). By way of another example, the first UE 115-c may identify a satisfaction of a trigger condition based on a change in the packet expiration information determined at 325 satisfying some change threshold (e.g., based on a significant change in determined packet expiration information at the first UE 115-c). By way of yet another example, the first UE 115-a may identify a satisfaction of a trigger condition based on a QoS requirement at the UE 115-a satisfying some threshold quality (e.g., $QoS \geq QoS_{Thresh}$), a processing capability of the first UE 115-a satisfying a processing capability threshold, or any combination thereof.

At 335, the first UE 115-c, the second UE 115-d, or both, may transmit packet expiration information to the base station 105-b. In other words, the UEs 115 may transmit packet expiration information which was determined by the respective UEs 115 at 325. In this regard, the UEs 115 may transmit the packet expiration information at 335 based on receiving the control signaling at 305, transmitting the feedback information at 310, generating the data packets at 315, receiving the request at 320, determining the packet expiration information at 325, identifying the satisfaction of a trigger condition(s) at 330, or any combination thereof. The UEs 115 may be configured to transmit indications of packet expiration information via a UCI message, a MAC-CE message, or both.

In some aspects, the UEs 115 may transmit the packet expiration information within resources which were signaled/configured via the control signaling at 305 and/or the request at 320. For example, in cases where the control signaling indicates a periodicity associated with a set of transmission occasions for reporting packet expiration information, the first UE 115-a may transmit the packet expiration information within an indicated transmission occasion and in accordance with the indicated periodicity (e.g., in accordance with the indication of the periodicity). In additional or alternative implementations, the UEs 115 may transmit the packet expiration information in response to the request at 320, in response to a satisfaction of one or more trigger conditions at 330, or both.

At 340, the base station 105-b may be configured to determine DAS metrics for the first UE 115-c, the second UE 115-d, or both. In general, the base station 105-d may be configured to determine/calculate a DAS metric for each respective UE 115 which is served by the base station 105-b. For example, the base station 105-b may be configured to determine a first DAS metric for the first UE 115-c, and a second DAS metric for the second UE 115-d.

The base station 105-b may be configured to utilize received packet expiration information and any number of other parameters or characteristics to determine a DAS metric for each respective UE 115. For example, in some implementations, the base station 105-b may determine a DAS metric for the first UE 115-c based on packet expiration information for the first UE 115-c, an instantaneous achievable data rate at the first UE 115-c, an average throughput at the first UE 115-d, or any combination thereof. In this example, the base station 105-b may be configured to determine the instantaneous achievable data rate, the average throughput, or both, based on the feedback information (e.g., MCS feedback, CSI-RS feedback) received from the first UE 115-c at 310.

In some aspects, the base station 105-b may be configured to schedule wireless communications at the respective UEs 115 based on determined DAS metrics corresponding to each respective UE 115. In other words, the base station 105-b may be configured to rank or otherwise order UEs 115 based on (e.g., in accordance with) corresponding DAS metrics in order to prioritize scheduling and resource allocations provided to each respective UE 115.

At 345, the base station 105-b may transmit scheduling information to the first UE 115-c, the second UE 115-b, or both. In particular, the base station 105-b may be configured to transmit the scheduling information based on (e.g., in accordance with) the DAS metric(s) for the respective UEs 115 which were determined at 340. In this regard, the UEs 115 may receive the scheduling information at 345 based on receiving the control signaling at 305, transmitting the feedback information at 310, generating the data packets at 315, receiving the request at 320, determining the packet expiration information at 325, identifying the satisfaction of the trigger condition(s) at 330, transmitting the packet expiration information at 335, the determination of the DAS metric(s) at 340, or any combination thereof.

The scheduling information may include grants or resource allocations for transmitting one or more of the data packets generated at the respective UEs 115. In this regard, the scheduling information may be communicated via any message, including a DCI message, a MAC-CE message, and the like. For example, the scheduling information received by the first UE 115-c may schedule at least a subset of the data packets generated by the first UE 115-c at 315. In some implementations, the scheduling information may indicate individual data packets (or sets of data packets) which are to be transmitted. In additional or alternative implementations, the scheduling information may include a grant of resources which may be used by the first UE 115-c to transmit any generated data packet(s).

At 350, the first UE 115-c, the second UE 115-b, or both, may determine whether one or more data packets generated by the respective UEs 115 are valid. For example, the first UE 115-c may determine whether a generated data packet is valid based on the received scheduling information, the packet expiration time corresponding to the generated data packet, or both. In this regard, the UEs 115 may evaluate a validity of data packets based on generating the data packets at 315, packet expiration times of each respective data packet, receiving the scheduling information at 345, or any combination thereof.

At 355, the first UE 115-c, the second UE 115-d, or both, may discard (e.g., drop) expired data packets. For example, the first UE 115-c, may be configured to drop an expired data packet from a transmission buffer at the first UE 115-c based on identifying that the data packet is not valid (e.g., expired) at 350.

At 360, the first UE 115-c, the second UE 115-d, or both, may transmit at least one data packet to the base station 105-b in accordance with the scheduling information received by each respective UE 115 at 345. For example, the first UE 115-c may transmit at least one generated data packet in accordance with time and frequency resources which were allocated to the first UE 115-c via the scheduling information at 345. The UEs 115 may be configured to transmit the data packet(s) at 360 based on receiving the control signaling at 305, transmitting the feedback information at 310, generating the data packets at 315, receiving the request at 320, determining the packet expiration information at 325, identifying the satisfaction of the trigger condition(s) at 330, transmitting the packet expiration information at 335, the determination of the DAS metric(s) at 340, receiving the scheduling information at 345, evaluating the validity of data packets at 350, dropping expired data packets at 355, or any combination thereof.

Techniques described herein may enable the wireless communications system to support DAS. In particular, by enabling the UEs 115 to indicate packet expiration information (e.g., packet deadline information) to the base station 105-b, techniques described herein may enable the base station 105-b to take the packet expiration information for each respective UE 115 into account when scheduling wireless communications at the respective UEs 115, which may reduce a quantity and/or frequency of dropped packets at the respective UEs 115. Moreover, by reducing a quantity and frequency of dropped packets, techniques described herein may reduce a latency of wireless communications, and may lead to more efficient scheduling and a more efficient use of wireless resources.

Figure 4:
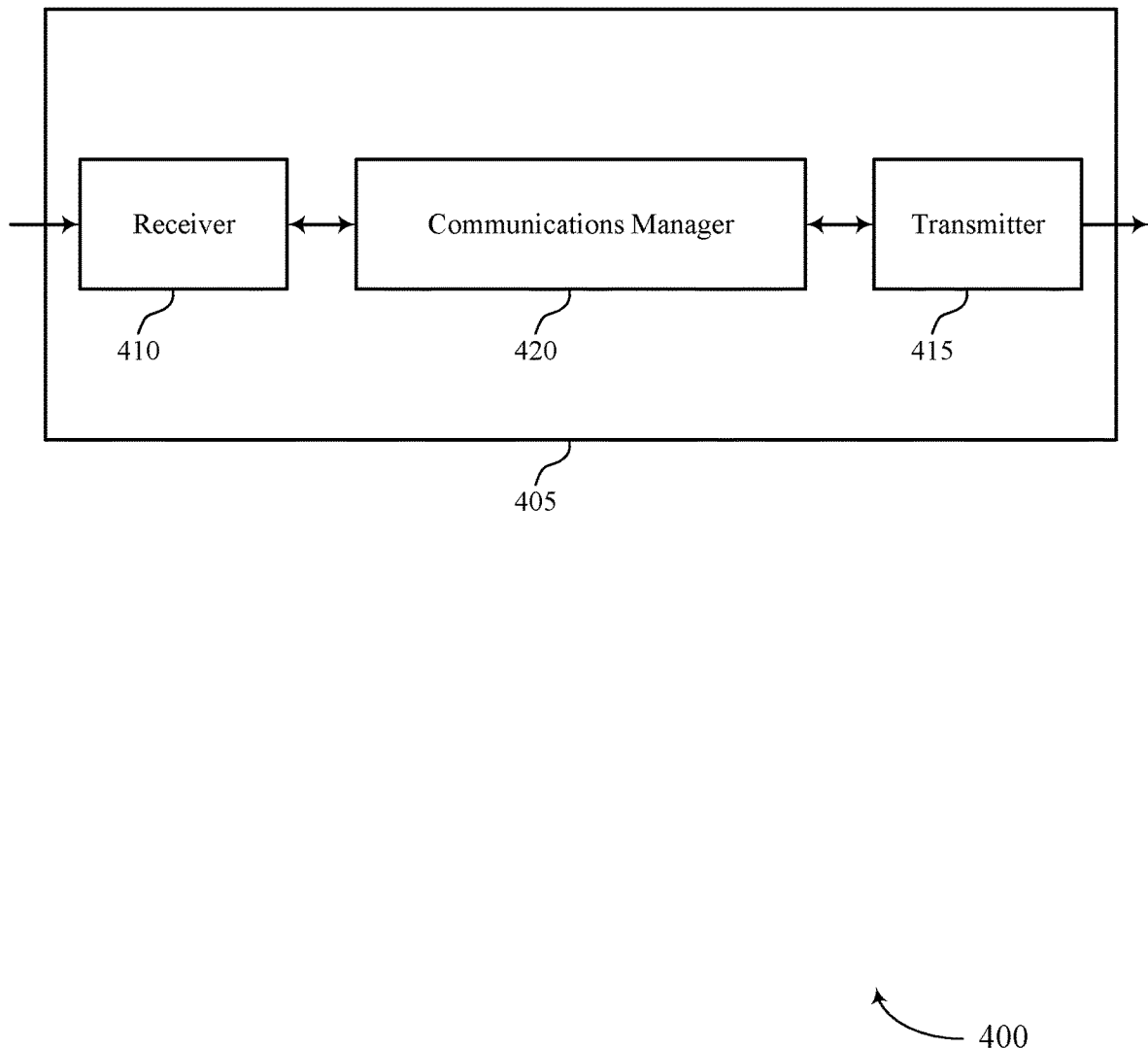
FIGS. 4 and 5 show block diagrams of devices that support techniques for DAS in accordance with aspects of the present disclosure.

FIG. 4 shows a block diagram 400 of a device 405 that supports techniques for DAS in accordance with aspects of the present disclosure. The device 405 may be an example of aspects of a UE 115 as described herein. The device 405 may include a receiver 410, a transmitter 415, and a communications manager 420. The device 405 may also include a processor (not shown). Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for DAS). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for DAS). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of techniques for DAS as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a UE in accordance with examples as disclosed herein. For example, the communications manager 420 may be configured as or otherwise support a means for generating a set of multiple data packets that are to be transmitted to a base station, where each data packet of the set of multiple data packets is associated with a respective packet expiration time. The communications manager 420 may be configured as or otherwise support a means for transmitting, to the base station, an indication of packet expiration information associated with the set of multiple data packets, where the packet expiration information is based on a set of multiple packet expiration times associated with the set of multiple data packets. The communications manager 420 may be configured as or otherwise support a means for receiving, from the base station, scheduling information associated with at least a subset of the set of multiple data packets, where the scheduling information is based on the packet expiration information. The communications manager 420 may be configured as or otherwise support a means for transmitting at least one data packet of the subset of the set of multiple data packets to the base station in accordance with the scheduling information.

By including or configuring the communications manager 420 in accordance with examples as described herein, the device 405 (e.g., a processor controlling or otherwise coupled to the receiver 410, the transmitter 415, the communications manager 420, or a combination thereof) may support techniques which enable wireless communications systems to support DAS. In particular, by enabling the UEs 115 to indicate packet expiration information (e.g., packet deadline information) to the base station 105-b, techniques described herein may enable the base station 105-b to take the packet expiration information for each respective UE 115 into account when scheduling wireless communications at the respective UEs 115, which may reduce a quantity and/or frequency of dropped packets at the respective UEs 115. Moreover, by reducing a quantity and frequency of dropped packets, techniques described herein may reduce a latency of wireless communications, and may lead to more efficient scheduling and a more efficient use of wireless resources.

Figure 5:
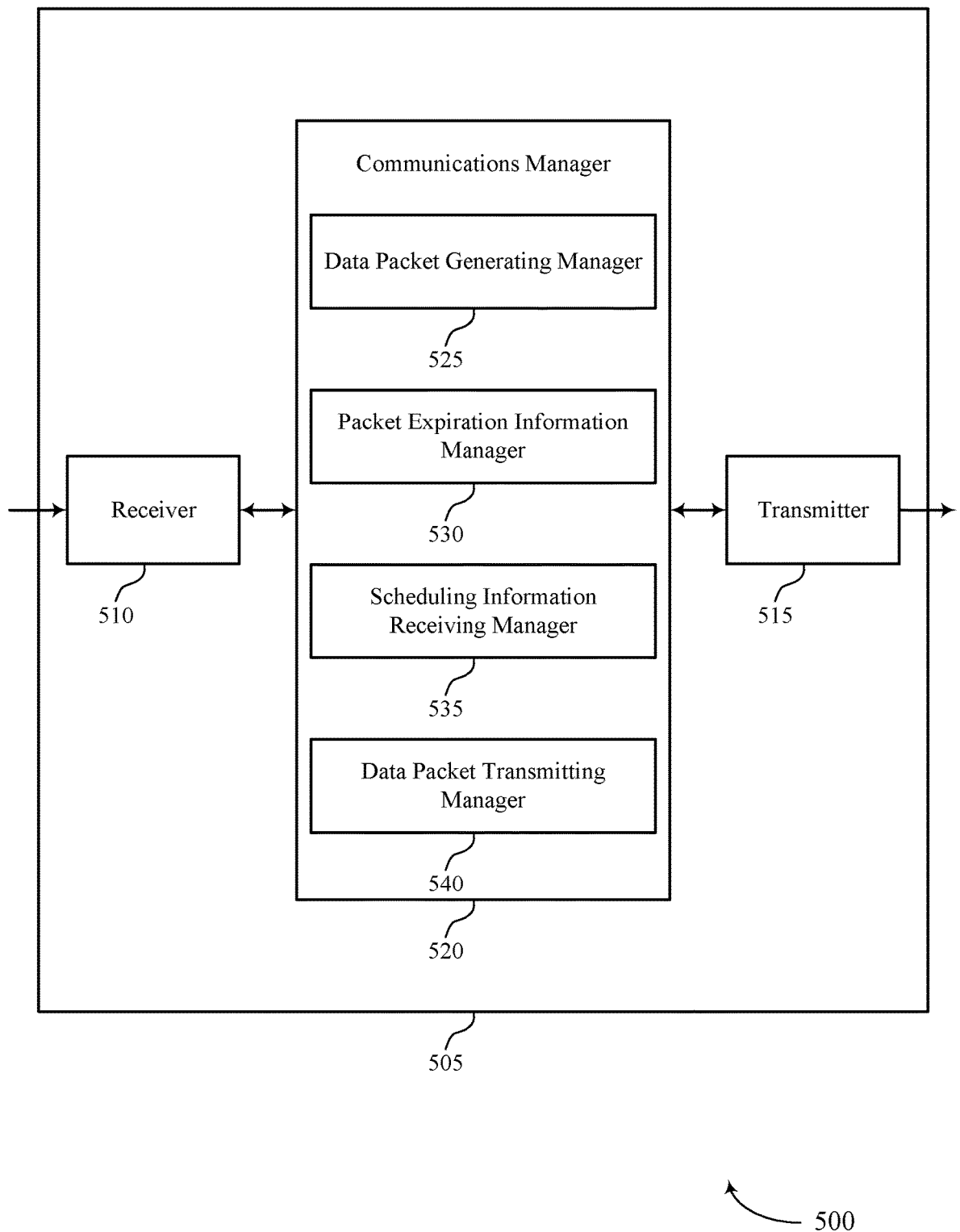

FIG. 5 shows a block diagram 500 of a device 505 that supports techniques for DAS in accordance with aspects of the present disclosure. The device 505 may be an example of aspects of a device 405 or a UE 115 as described herein. The device 505 may include a receiver 510, a transmitter 515, and a communications manager 520. The device 505 may also include a processor (not shown). Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for DAS). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for DAS). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of techniques for DAS as described herein. For example, the communications manager 520 may include a data packet generating manager 525, a packet expiration information manager 530, a scheduling information receiving manager 535, a data packet transmitting manager 540, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. The data packet generating manager 525 may be configured as or otherwise support a means for generating a set of multiple data packets that are to be transmitted to a base station, where each data packet of the set of multiple data packets is associated with a respective packet expiration time. The packet expiration information manager 530 may be configured as or otherwise support a means for transmitting, to the base station, an indication of packet expiration information associated with the set of multiple data packets, where the packet expiration information is based on a set of multiple packet expiration times associated with the set of multiple data packets. The scheduling information receiving manager 535 may be configured as or otherwise support a means for receiving, from the base station, scheduling information associated with at least a subset of the set of multiple data packets, where the scheduling information is based on the packet expiration information. The data packet transmitting manager 540 may be configured as or otherwise support a means for transmitting at least one data packet of the subset of the set of multiple data packets to the base station in accordance with the scheduling information.

Figure 6:
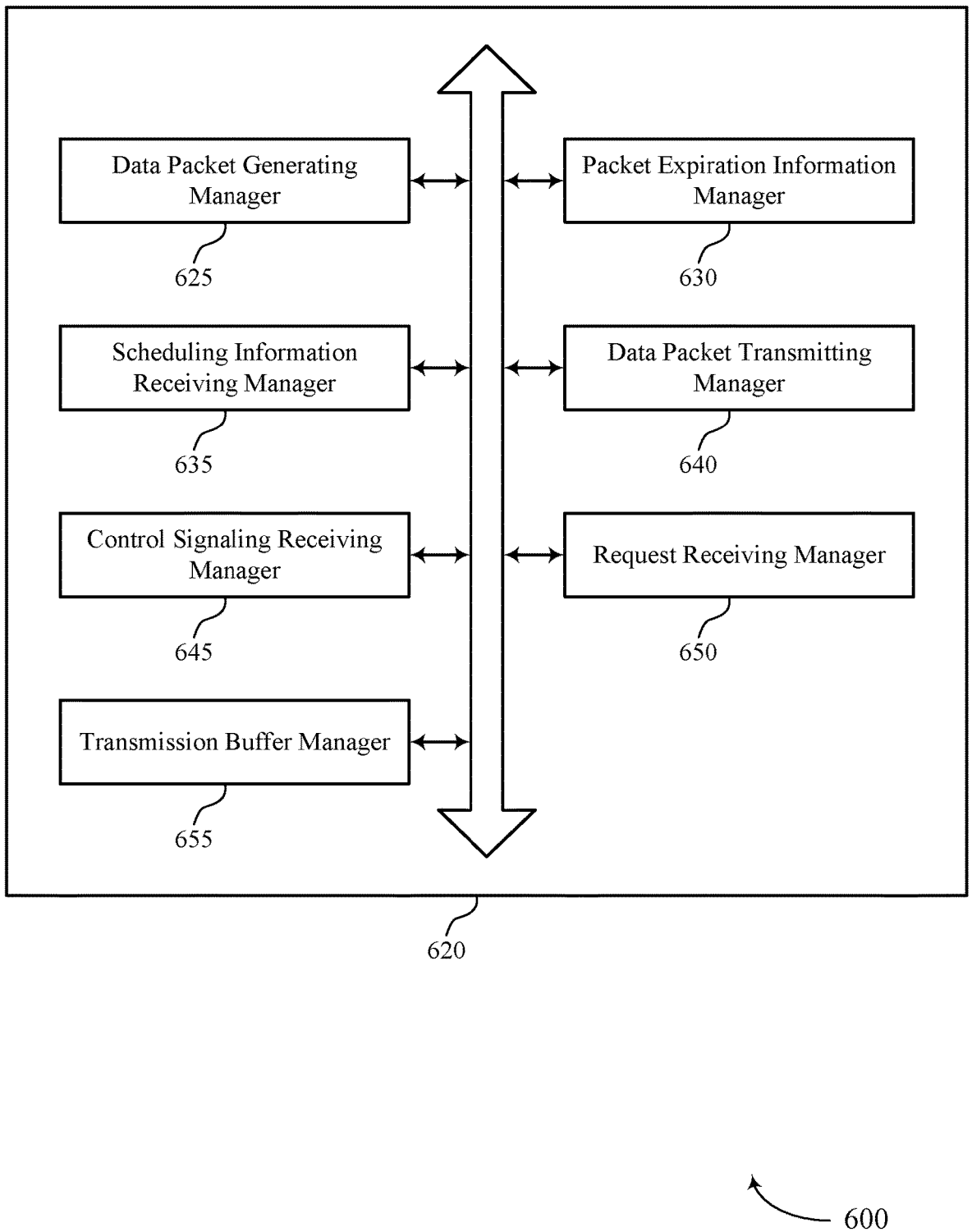
FIG. 6 shows a block diagram of a communications manager that supports techniques for DAS in accordance with aspects of the present disclosure.

FIG. 6 shows a block diagram 600 of a communications manager 620 that supports techniques for DAS in accordance with aspects of the present disclosure. The communications manager 620 may be an example of aspects of a communications manager 420, a communications manager 520, or both, as described herein. The communications manager 620, or various components thereof, may be an example of means for performing various aspects of techniques for DAS as described herein. For example, the communications manager 620 may include a data packet generating manager 625, a packet expiration information manager 630, a scheduling information receiving manager 635, a data packet transmitting manager 640, a control signaling receiving manager 645, a request receiving manager 650, a transmission buffer manager 655, or any combination thereof. Each of these components may communicate, directly or indirectly, with one another (e.g., via one or more buses).

The communications manager 620 may support wireless communication at a UE in accordance with examples as disclosed herein. The data packet generating manager 625 may be configured as or otherwise support a means for generating a set of multiple data packets that are to be transmitted to a base station, where each data packet of the set of multiple data packets is associated with a respective packet expiration time. The packet expiration information manager 630 may be configured as or otherwise support a means for transmitting, to the base station, an indication of packet expiration information associated with the set of multiple data packets, where the packet expiration information is based on a set of multiple packet expiration times associated with the set of multiple data packets. The scheduling information receiving manager 635 may be configured as or otherwise support a means for receiving, from the base station, scheduling information associated with at least a subset of the set of multiple data packets, where the scheduling information is based on the packet expiration information. The data packet transmitting manager 640 may be configured as or otherwise support a means for transmitting at least one data packet of the subset of the set of multiple data packets to the base station in accordance with the scheduling information.

In some examples, the control signaling receiving manager 645 may be configured as or otherwise support a means for receiving, from the base station, control signaling including an indication of a periodicity associated with a set of multiple transmission occasions for communicating the packet expiration information, where the indication of the packet expiration information is transmitted in accordance with the indicated periodicity (e.g., in accordance with the indication of the periodicity) and within a transmission occasion of the set of multiple transmission occasions.

In some examples, the control signaling receiving manager 645 may be configured as or otherwise support a means for receiving, from the base station, control signaling including an indication of one or more trigger conditions for communicating the packet expiration information, where transmitting the indication of the packet expiration information is based on a satisfaction of the one or more trigger conditions.

In some examples, the satisfaction of the one or more trigger conditions is based on a packet expiration time of the set of multiple packet expiration times satisfying a duration threshold, a change in the packet expiration information satisfying some change threshold, a QoS requirement at the UE satisfying a threshold quality, a processing capability of the UE satisfying a processing capability threshold, or any combination thereof.

In some examples, the request receiving manager 650 may be configured as or otherwise support a means for receiving, from the base station, a request for the packet expiration information, where the indication of the packet expiration information is transmitted in response to the request. In some examples, the request is received via a DCI message, a MAC-CE message, or both.

In some examples, the packet expiration information manager 630 may be configured as or otherwise support a means for determining the packet expiration information in accordance with a packet expiry configuration, the packet expiry configuration including one or more mathematical operations for determining the packet expiration information based on the set of multiple packet expiration times.

In some examples, the control signaling receiving manager 645 may be configured as or otherwise support a means for receiving, from the base station, a control message indicating the packet expiry configuration, where determining the packet expiration information is based on receiving the control message. In some examples, the control signaling receiving manager 645 may be configured as or otherwise support a means for receiving, from the base station, additional control signaling indicating a set of multiple packet expiry configurations including the packet expiry configuration, where the control message is received based on receiving the additional control signaling, and where determining the packet expiration information is based on receiving the additional control signaling.

In some examples, to support determining the packet expiration information in accordance with the packet expiry configuration, the packet expiration information manager 630 may be configured as or otherwise support a means for determining an average of the set of multiple packet expiration times, a median of the set of multiple packet expiration times, a minimum of the set of multiple packet expiration times, a maximum of the set of multiple packet expiration times, or any combination thereof.

In some examples, to support transmitting the at least one data packet of the set of multiple data packets, the transmission buffer manager 655 may be configured as or otherwise support a means for identifying that a first data packet of the set of multiple data packets is valid based on the scheduling information and a first packet expiration time corresponding to the first data packet. In some examples, to support transmitting the at least one data packet of the set of multiple data packets, the data packet transmitting manager 640 may be configured as or otherwise support a means for transmitting the first data packet based on identifying that the first data packet is valid, where the at least one transmitted data packet includes the first data packet.

In some examples, the transmission buffer manager 655 may be configured as or otherwise support a means for identifying that a second data packet of the set of multiple data packets is expired based on the scheduling information and a second packet expiration time corresponding to the second data packet. In some examples, the data packet transmitting manager 640 may be configured as or otherwise support a means for refraining from transmitting the second data packet based on identifying that the second data packet is expired.

In some examples, the transmission buffer manager 655 may be configured as or otherwise support a means for discarding the second data packet from a transmission buffer at the UE based on identifying that the second data packet is expired, where refraining from transmitting the second data packet is based on discarding the second data packet. In some examples, the indication of the packet expiration information is transmitted via a UCI message, a MAC-CE message, or both.

Figure 7:
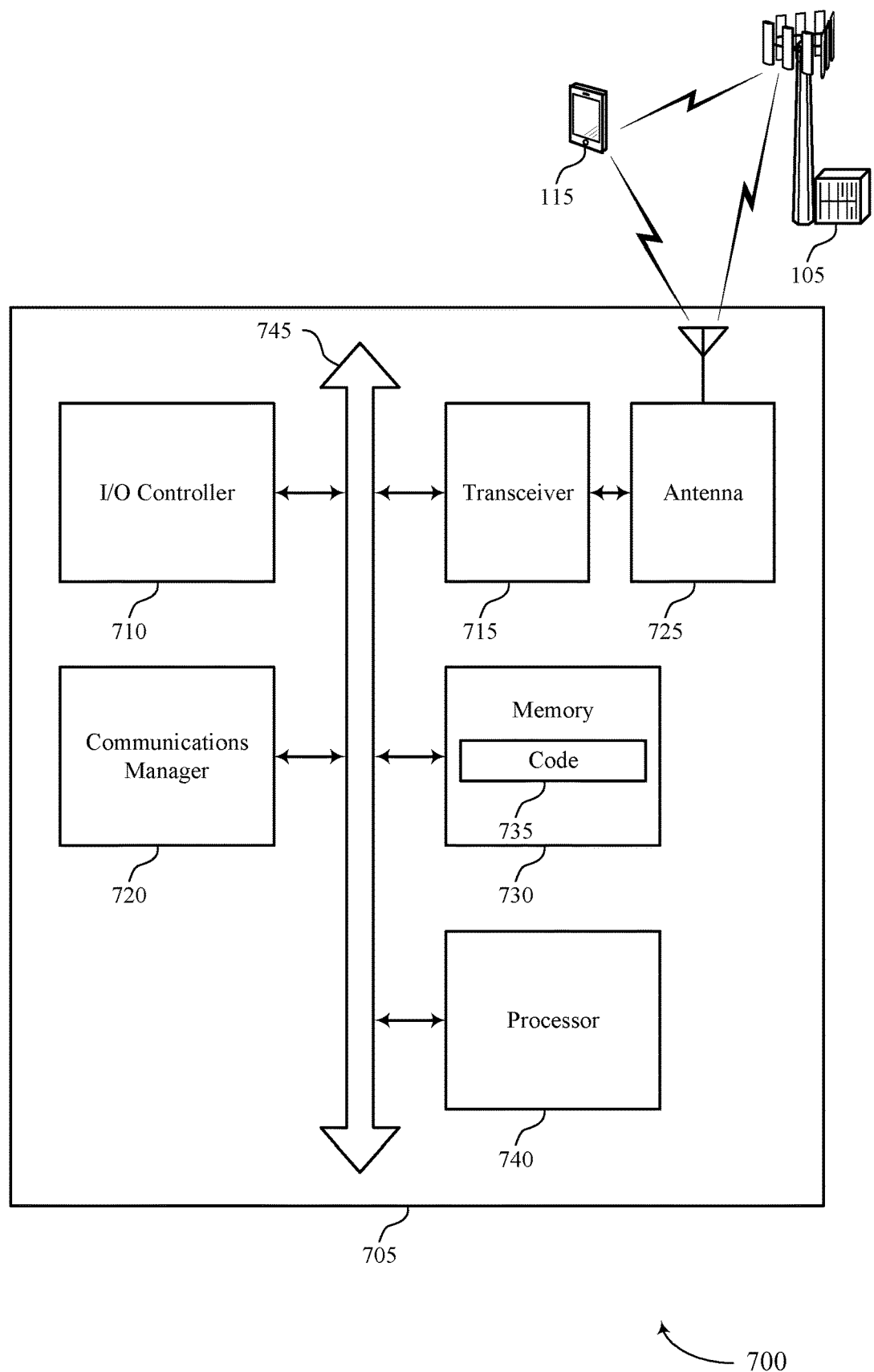
FIG. 7 shows a diagram of a system including a device that supports techniques for DAS in accordance with aspects of the present disclosure.

FIG. 7 shows a diagram of a system 700 including a device 705 that supports techniques for DAS in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for DAS). For example, the device 705 or a component of the device 705 may include a processor 740 and memory 730 coupled to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for generating a set of multiple data packets that are to be transmitted to a base station, where each data packet of the set of multiple data packets is associated with a respective packet expiration time. The communications manager 720 may be configured as or otherwise support a means for transmitting, to the base station, an indication of packet expiration information associated with the set of multiple data packets, where the packet expiration information is based on a set of multiple packet expiration times associated with the set of multiple data packets. The communications manager 720 may be configured as or otherwise support a means for receiving, from the base station, scheduling information associated with at least a subset of the set of multiple data packets, where the scheduling information is based on the packet expiration information. The communications manager 720 may be configured as or otherwise support a means for transmitting at least one data packet of the subset of the set of multiple data packets to the base station in accordance with the scheduling information.

By including or configuring the communications manager 720 in accordance with examples as described herein, the device 705 may support techniques which enable wireless communications systems to support DAS. In particular, by enabling the UEs 115 to indicate packet expiration information (e.g., packet deadline information) to the base station 105-*b*, techniques described herein may enable the base station 105-*b* to take the packet expiration information for each respective UE 115 into account when scheduling wireless communications at the respective UEs 115, which may reduce a quantity and/or frequency of dropped packets at the respective UEs 115. Moreover, by reducing a quantity and frequency of dropped packets, techniques described herein may reduce a latency of wireless communications, and may lead to more efficient scheduling and a more efficient use of wireless resources.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described herein with reference to the communications manager 720 may be supported by or performed by the processor 740, the memory 730, the code 735, or any combination thereof. For example, the code 735 may include instructions executable by the processor 740 to cause the device 705 to perform various aspects of techniques for DAS as described herein, or the processor 740 and the memory 730 may be otherwise configured to perform or support such operations.

Figure 8:
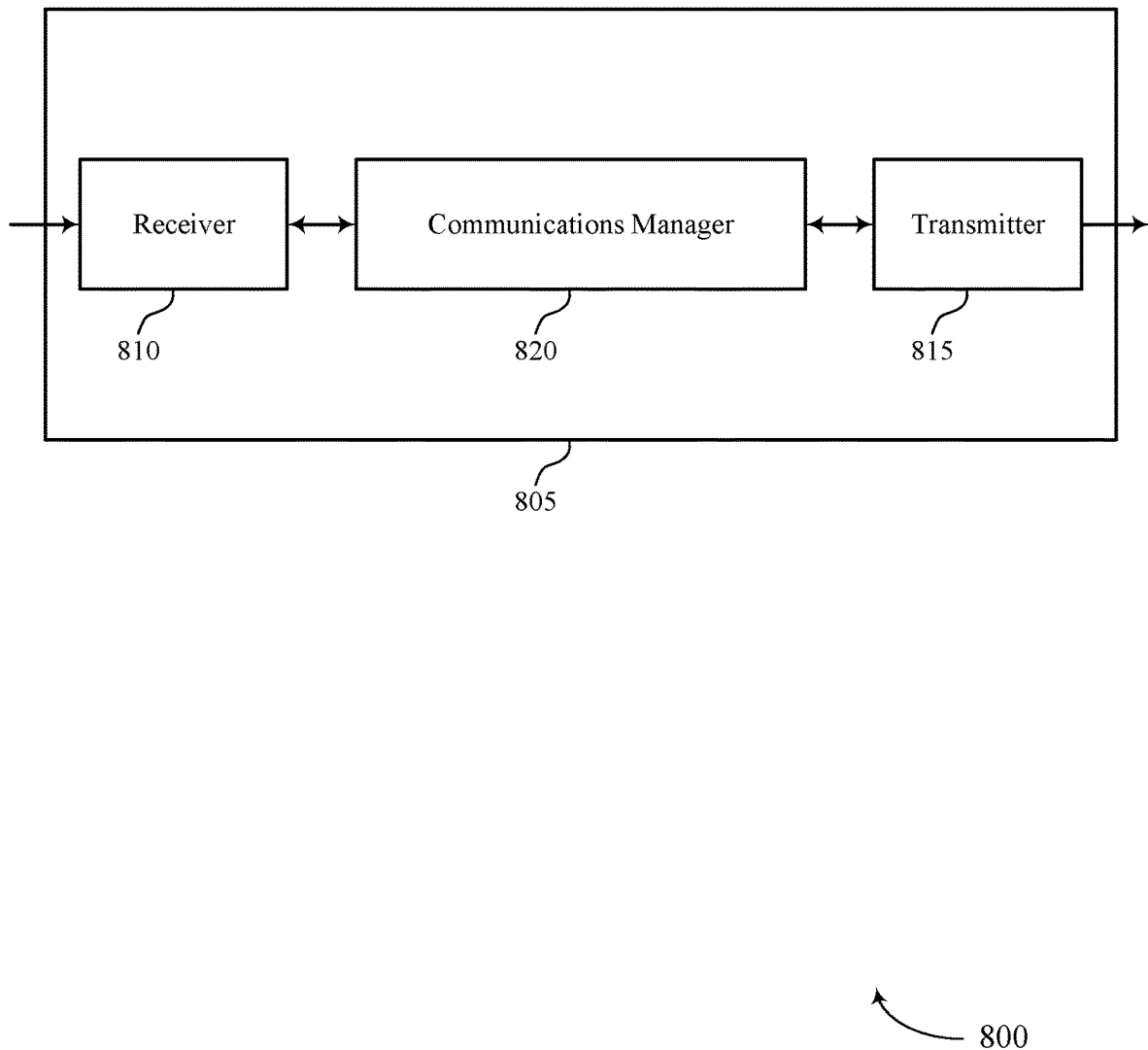
FIGS. 8 and 9 show block diagrams of devices that support techniques for DAS in accordance with aspects of the present disclosure.

FIG. 8 shows a block diagram 800 of a device 805 that supports techniques for DAS in accordance with aspects of the present disclosure. The device 805 may be an example of aspects of a base station 105 as described herein. The device 805 may include a receiver 810, a transmitter 815, and a communications manager 820. The device 805 may also include a processor (not shown). Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for DAS). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for DAS). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of techniques for DAS as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a base station in accordance with examples as disclosed herein. For example, the communications manager 820 may be configured as or otherwise support a means for receiving, from a UE, an indication of packet expiration information associated with a set of multiple data packets generated by the UE, where the packet expiration information is based on a set of multiple packet expiration times associated with the set of multiple data packets. The communications manager 820 may be configured as or otherwise support a means for transmitting, to the UE, scheduling information associated with at least a subset of the set of multiple data packets, where the scheduling information is based on the packet expiration information. The communications manager 820 may be configured as or otherwise support a means for receiving at least one data packet of the subset of the set of multiple data packets from the UE in accordance with the scheduling information.

By including or configuring the communications manager 820 in accordance with examples as described herein, the device 805 (e.g., a processor controlling or otherwise coupled to the receiver 810, the transmitter 815, the communications manager 820, or a combination thereof) may support techniques which enable wireless communications systems to support DAS. In particular, by enabling the UEs 115 to indicate packet expiration information (e.g., packet deadline information) to the base station 105-*b*, techniques described herein may enable the base station 105-*b* to take the packet expiration information for each respective UE 115 into account when scheduling wireless communications at the respective UEs 115, which may reduce a quantity and/or frequency of dropped packets at the respective UEs 115. Moreover, by reducing a quantity and frequency of dropped packets, techniques described herein may reduce a latency of wireless communications, and may lead to more efficient scheduling and a more efficient use of wireless resources.

Figure 9:
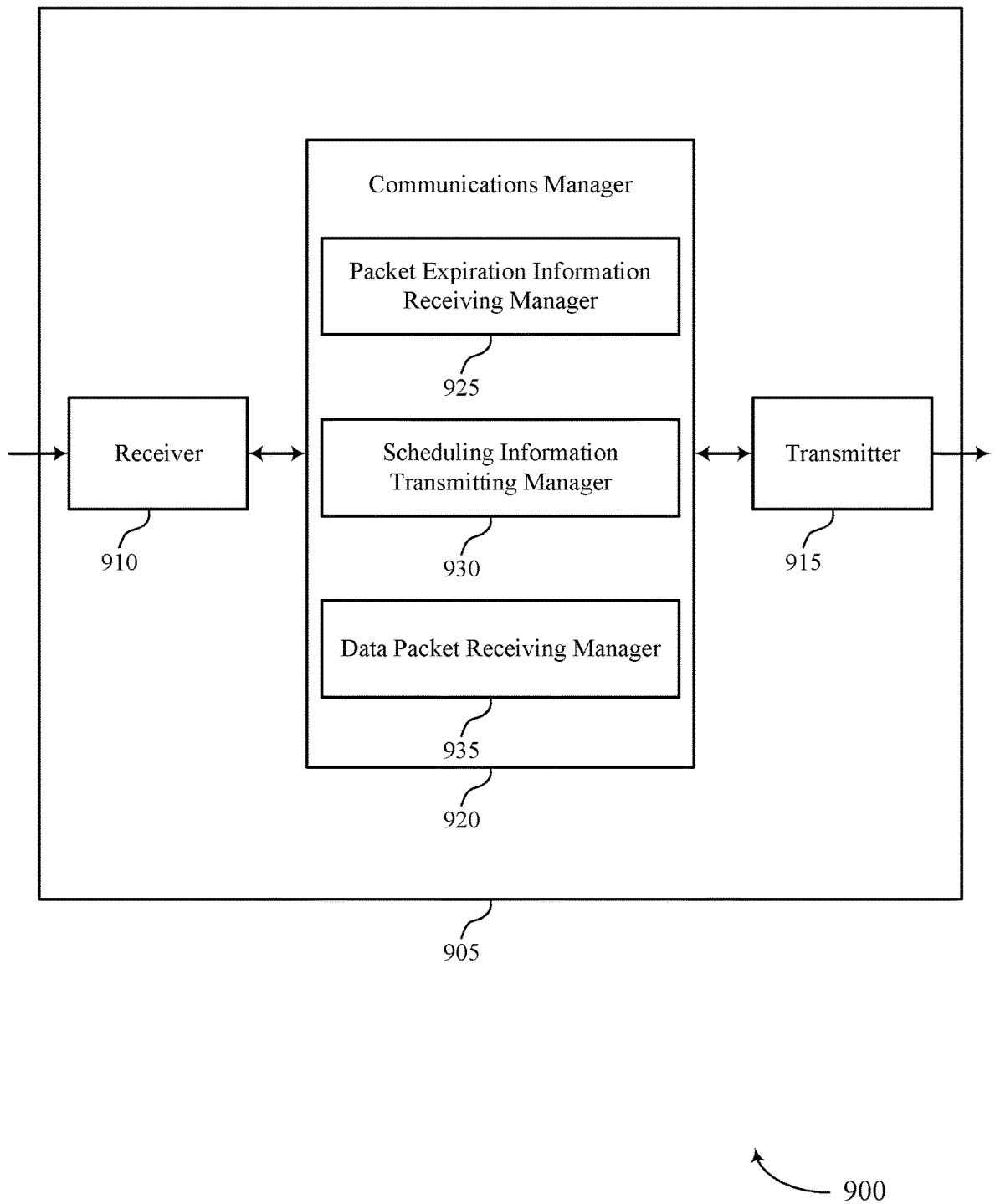

FIG. 9 shows a block diagram 900 of a device 905 that supports techniques for DAS in accordance with aspects of the present disclosure. The device 905 may be an example of aspects of a device 805 or a base station 105 as described herein. The device 905 may include a receiver 910, a transmitter 915, and a communications manager 920. The device 905 may also include a processor (not shown). Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for DAS). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for DAS). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of techniques for DAS as described herein. For example, the communications manager 920 may include a packet expiration information receiving manager 925, a scheduling information transmitting manager 930, a data packet receiving manager 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. The packet expiration information receiving manager 925 may be configured as or otherwise support a means for receiving, from a UE, an indication of packet expiration information associated with a set of multiple data packets generated by the UE, where the packet expiration information is based on a set of multiple packet expiration times associated with the set of multiple data packets. The scheduling information transmitting manager 930 may be configured as or otherwise support a means for transmitting, to the UE, scheduling information associated with at least a subset of the set of multiple data packets, where the scheduling information is based on the packet expiration information. The data packet receiving manager 935 may be configured as or otherwise support a means for receiving at least one data packet of the subset of the set of multiple data packets from the UE in accordance with the scheduling information.

Figure 10:
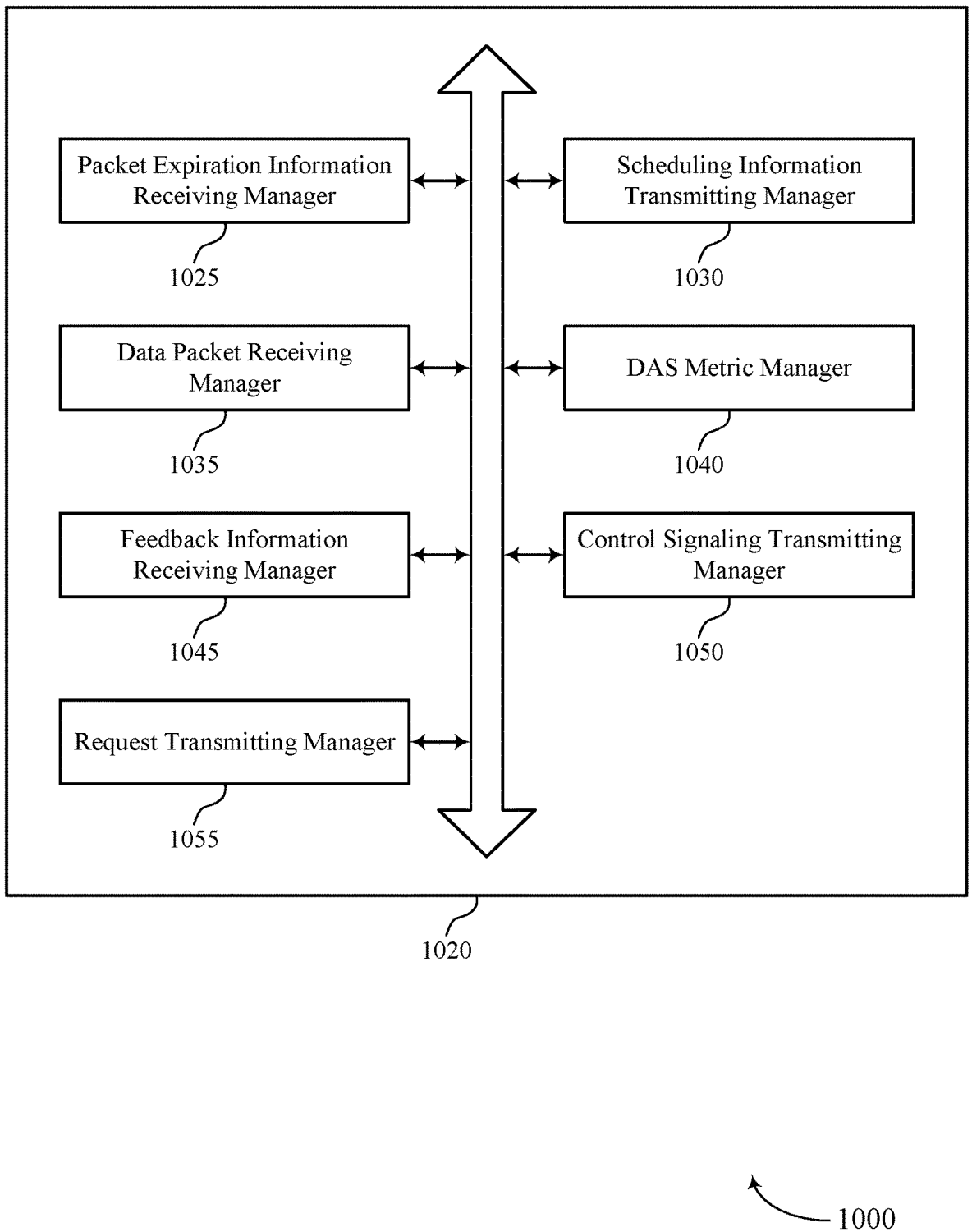
FIG. 10 shows a block diagram of a communications manager that supports techniques for DAS in accordance with aspects of the present disclosure.

FIG. 10 shows a block diagram 1000 of a communications manager 1020 that supports techniques for DAS in accordance with aspects of the present disclosure. The communications manager 1020 may be an example of aspects of a communications manager 820, a communications manager 920, or both, as described herein. The communications manager 1020, or various components thereof, may be an example of means for performing various aspects of techniques for DAS as described herein. For example, the communications manager 1020 may include a packet expiration information receiving manager 1025, a scheduling information transmitting manager 1030, a data packet receiving manager 1035, a DAS metric manager 1040, a feedback information receiving manager 1045, a control signaling transmitting manager 1050, a request transmitting manager 1055, or any combination thereof. Each of these components may communicate, directly or indirectly, with one another (e.g., via one or more buses).

The communications manager 1020 may support wireless communication at a base station in accordance with examples as disclosed herein. The packet expiration information receiving manager 1025 may be configured as or otherwise support a means for receiving, from a UE, an indication of packet expiration information associated with a set of multiple data packets generated by the UE, where the packet expiration information is based on a set of multiple packet expiration times associated with the set of multiple data packets. The scheduling information transmitting manager 1030 may be configured as or otherwise support a means for transmitting, to the UE, scheduling information associated with at least a subset of the set of multiple data packets, where the scheduling information is based on the packet expiration information. The data packet receiving manager 1035 may be configured as or otherwise support a means for receiving at least one data packet of the subset of the set of multiple data packets from the UE in accordance with the scheduling information.

In some examples, the DAS metric manager 1040 may be configured as or otherwise support a means for determining a DAS metric associated with the UE based on the packet expiration information, an instantaneous achievable data rate at the UE, an average throughput at the UE, or any combination thereof, where transmitting the scheduling information is based on the DAS metric.

In some examples, the feedback information receiving manager 1045 may be configured as or otherwise support a means for receiving feedback information from the UE, where the instantaneous achievable data rate, the average throughput, or both, are based on the feedback information.

In some examples, to support receiving the indication of the packet expiration information, the packet expiration information receiving manager 1025 may be configured as or otherwise support a means for receiving an indication of packet expiration information associated with a set of multiple UEs including the UE. In some examples, to support receiving the indication of the packet expiration information, the DAS metric manager 1040 may be configured as or otherwise support a means for determining a set of multiple DAS metrics associated with the set of multiple UEs based on received packet expiration information corresponding to each UE of the set of multiple UEs, where transmitting the scheduling information is based on the set of multiple DAS metrics.

In some examples, the control signaling transmitting manager 1050 may be configured as or otherwise support a means for transmitting, to the UE, control signaling including an indication of a periodicity associated with a set of multiple transmission occasions for communicating the packet expiration information, where the indication of the packet expiration information is received in accordance with the indicated periodicity and within a transmission occasion of the set of multiple transmission occasions.

In some examples, the control signaling transmitting manager 1050 may be configured as or otherwise support a means for transmitting, to the UE, control signaling including an indication of one or more trigger conditions for communicating the packet expiration information, where receiving the indication of the packet expiration information is based on a satisfaction of the one or more trigger conditions. In some examples, the satisfaction of the one or more trigger conditions is based on a packet expiration time of the set of multiple packet expiration times satisfying a duration threshold, a change in the packet expiration information satisfying some change threshold, a QoS requirement at the UE satisfying a threshold quality, a processing capability of the UE satisfying a processing capability threshold, or any combination thereof.

In some examples, the request transmitting manager 1055 may be configured as or otherwise support a means for transmitting, to the UE, a request for the packet expiration information, where the indication of the packet expiration information is received in response to the request. In some examples, the request is transmitted via a DCI message, a MAC-CE message, or both.

In some examples, the control signaling transmitting manager 1050 may be configured as or otherwise support a means for transmitting, to the UE, a control message indicating a packet expiry configuration, where the packet expiration information is determined in accordance with the packet expiry configuration, the packet expiry configuration including one or more mathematical operations for determining the packet expiration information based on the set of multiple packet expiration times. In some examples, the control signaling transmitting manager 1050 may be configured as or otherwise support a means for transmitting, to the UE, additional control signaling indicating a set of multiple packet expiry configurations including the packet expiry configuration, where the control message is transmitted based on transmitting the additional control signaling. In some examples, the indication of the packet expiration information is received via a UCI message, a MAC-CE message, or both.

Figure 11:
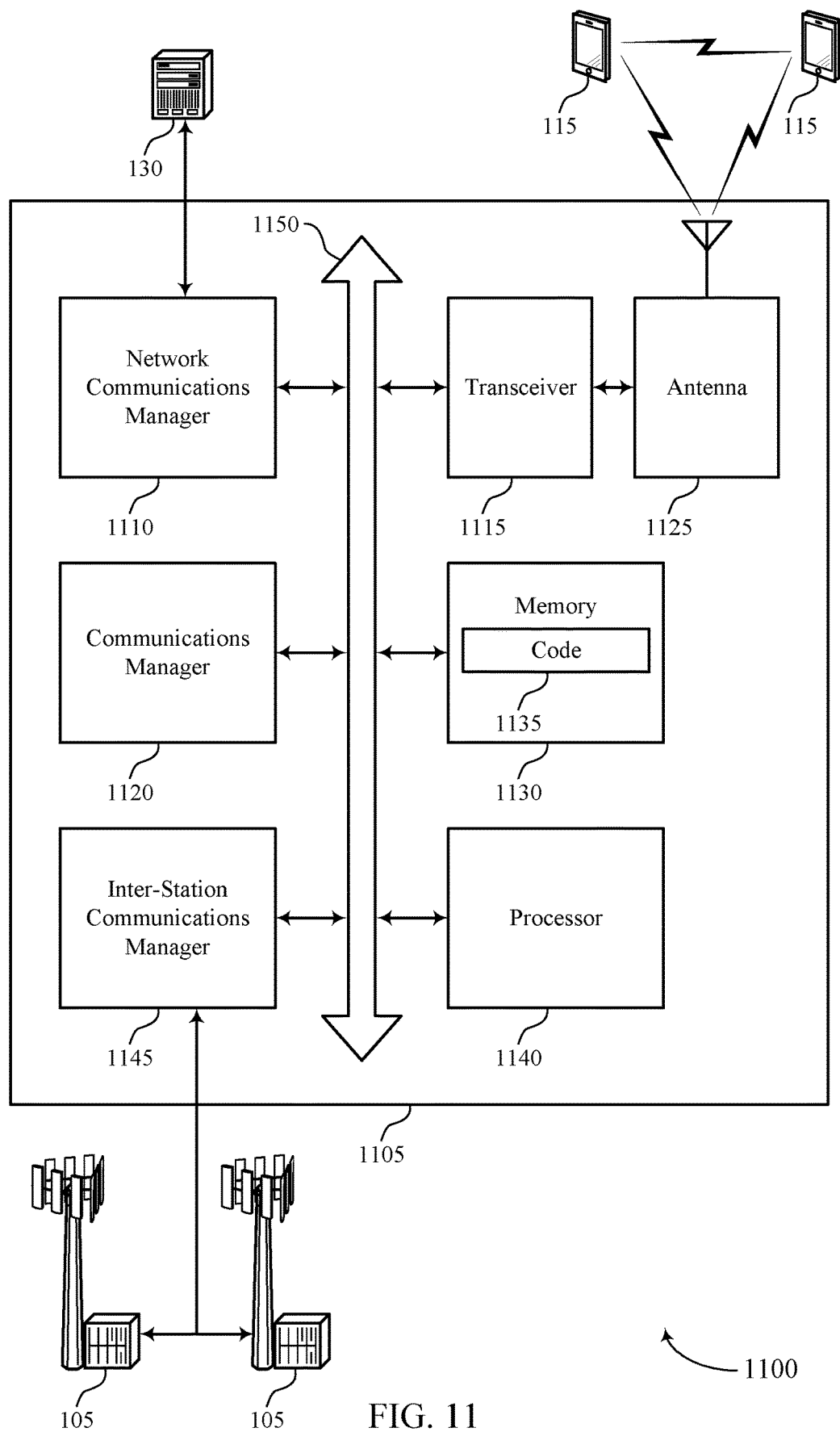
FIG. 11 shows a diagram of a system including a device that supports techniques for DAS in accordance with aspects of the present disclosure.

FIG. 11 shows a diagram of a system 1100 including a device 1105 that supports techniques for DAS in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an interstation communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for DAS). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a base station in accordance with examples as disclosed herein. For example, the communications manager 1120 may be configured as or otherwise support a means for receiving, from a UE, an indication of packet expiration information associated with a set of multiple data packets generated by the UE, where the packet expiration information is based on a set of multiple packet expiration times associated with the set of multiple data packets. The communications manager 1120 may be configured as or otherwise support a means for transmitting, to the UE, scheduling information associated with at least a subset of the set of multiple data packets, where the scheduling information is based on the packet expiration information. The communications manager 1120 may be configured as or otherwise support a means for receiving at least one data packet of the subset of the set of multiple data packets from the UE in accordance with the scheduling information.

By including or configuring the communications manager 1120 in accordance with examples as described herein, the device 1105 may support techniques which enable wireless communications systems to support DAS. In particular, by enabling the UEs 115 to indicate packet expiration information (e.g., packet deadline information) to the base station 105-b, techniques described herein may enable the base station 105-b to take the packet expiration information for each respective UE 115 into account when scheduling wireless communications at the respective UEs 115, which may reduce a quantity and/or frequency of dropped packets at the respective UEs 115. Moreover, by reducing a quantity and frequency of dropped packets, techniques described herein may reduce a latency of wireless communications, and may lead to more efficient scheduling and a more efficient use of wireless resources.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described herein with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of techniques for DAS as described herein, or the processor 1140 and the memory 1130 may be otherwise configured to perform or support such operations.

Figure 12:
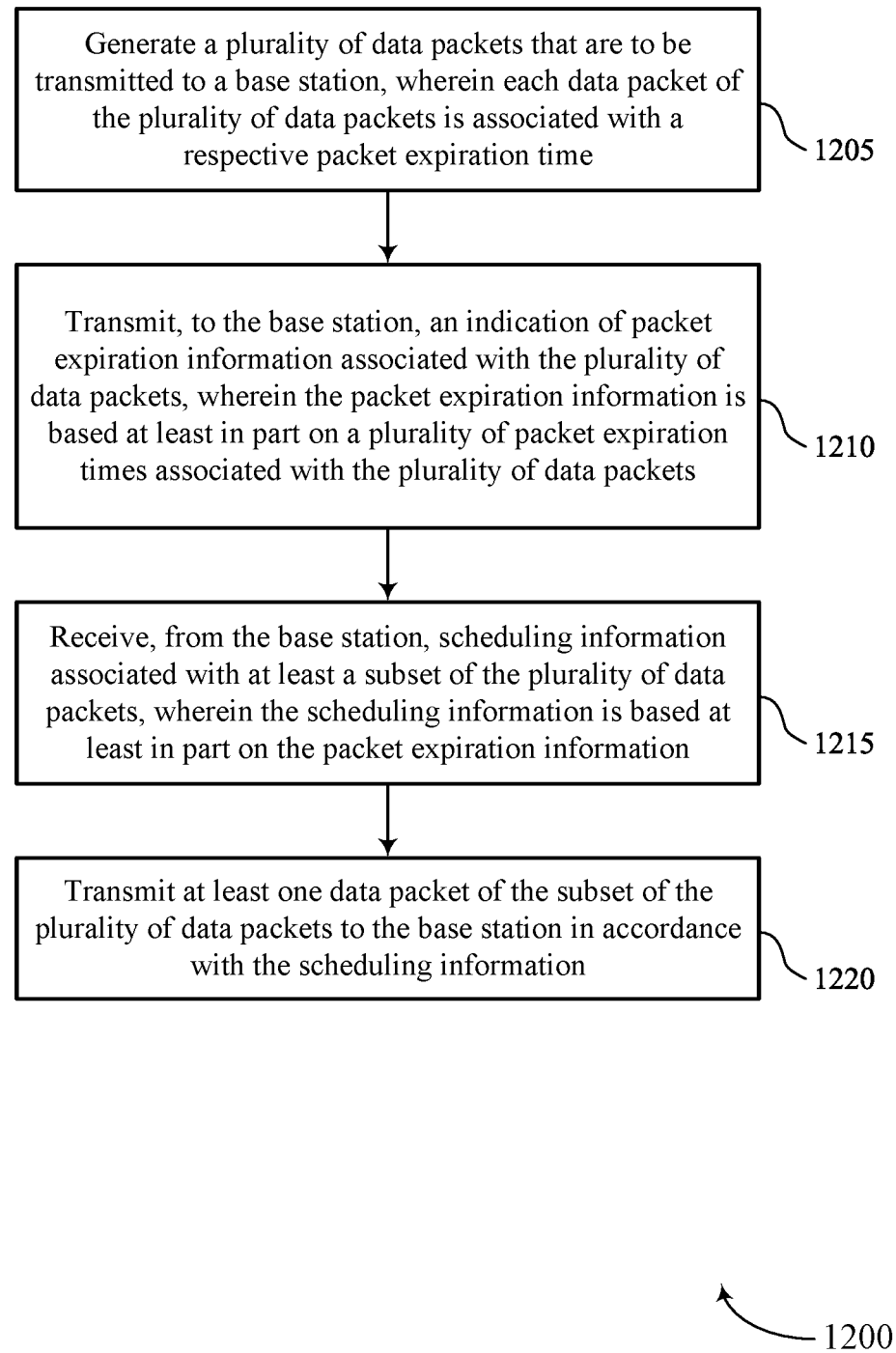
FIGS. 12 through 16 show flowcharts illustrating methods that support techniques for DAS in accordance with aspects of the present disclosure.

FIG. 12 shows a flowchart illustrating a method 1200 that supports techniques for DAS in accordance with aspects of the present disclosure. The operations of the method 1200 may be implemented by a UE or its components as described herein. For example, the operations of the method 1200 may be performed by a UE 115 as described herein with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include generating a plurality of data packets that are to be transmitted to a base station, where each data packet of the plurality of data packets is associated with a respective packet expiration time. The operations of 1205 may be performed in accordance with examples as disclosed herein. In some examples, aspects of the operations of 1205 may be performed by a data packet generating manager 625 as described herein with reference to FIG. 6.

At 1210, the method may include transmitting, to the base station, an indication of packet expiration information associated with the plurality of data packets, where the packet expiration information is based at least in part on a plurality of packet expiration times associated with the plurality of data packets. The operations of 1210 may be performed in accordance with examples as disclosed herein. In some examples, aspects of the operations of 1210 may be performed by a packet expiration information manager 630 as described herein with reference to FIG. 6.

At 1215, the method may include receiving, from the base station, scheduling information associated with at least a subset of the plurality of data packets, where the scheduling information is based at least in part on the packet expiration information. The operations of 1215 may be performed in accordance with examples as disclosed herein. In some examples, aspects of the operations of 1215 may be performed by a scheduling information receiving manager 635 as described herein with reference to FIG. 6.

At 1220, the method may include transmitting at least one data packet of the subset of the plurality of data packets to the base station in accordance with the scheduling information. The operations of 1220 may be performed in accordance with examples as disclosed herein. In some examples, aspects of the operations of 1220 may be performed by a data packet transmitting manager 640 as described herein with reference to FIG. 6.

Figure 13:
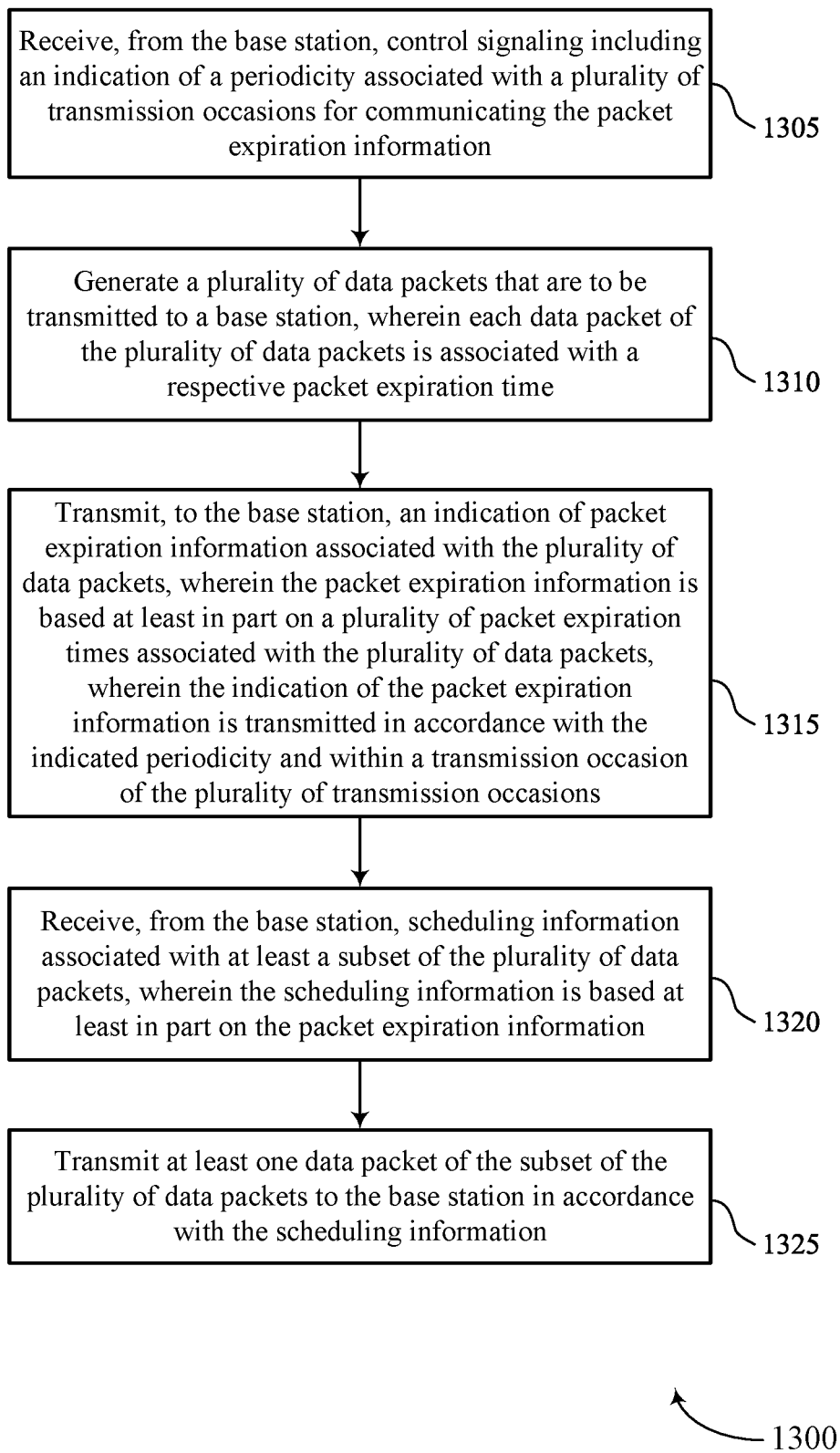

FIG. 13 shows a flowchart illustrating a method 1300 that supports techniques for DAS in accordance with aspects of the present disclosure. The operations of the method 1300 may be implemented by a UE or its components as described herein. For example, the operations of the method 1300 may be performed by a UE 115 as described herein with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include receiving, from the base station, control signaling including an indication of a periodicity associated with a plurality of transmission occasions for communicating the packet expiration information. The operations of 1305 may be performed in accordance with examples as disclosed herein. In some examples, aspects of the operations of 1305 may be performed by a control signaling receiving manager 645 as described herein with reference to FIG. 6.

At 1310, the method may include generating a plurality of data packets that are to be transmitted to a base station, where each data packet of the plurality of data packets is associated with a respective packet expiration time. The operations of 1310 may be performed in accordance with examples as disclosed herein. In some examples, aspects of the operations of 1310 may be performed by a data packet generating manager 625 as described herein with reference to FIG. 6.

At 1315, the method may include transmitting, to the base station, an indication of packet expiration information associated with the plurality of data packets, where the packet expiration information is based at least in part on a plurality of packet expiration times associated with the plurality of data packets, where the indication of the packet expiration information is transmitted in accordance with the indicated periodicity and within a transmission occasion of the plurality of transmission occasions. The operations of 1315 may be performed in accordance with examples as disclosed herein. In some examples, aspects of the operations of 1315 may be performed by a packet expiration information manager 630 as described herein with reference to FIG. 6.

At 1320, the method may include receiving, from the base station, scheduling information associated with at least a subset of the plurality of data packets, where the scheduling information is based at least in part on the packet expiration information. The operations of 1320 may be performed in accordance with examples as disclosed herein. In some examples, aspects of the operations of 1320 may be performed by a scheduling information receiving manager 635 as described herein with reference to FIG. 6.

At 1325, the method may include transmitting at least one data packet of the subset of the plurality of data packets to the base station in accordance with the scheduling information. The operations of 1325 may be performed in accordance with examples as disclosed herein. In some examples, aspects of the operations of 1325 may be performed by a data packet transmitting manager 640 as described herein with reference to FIG. 6.

Figure 14:
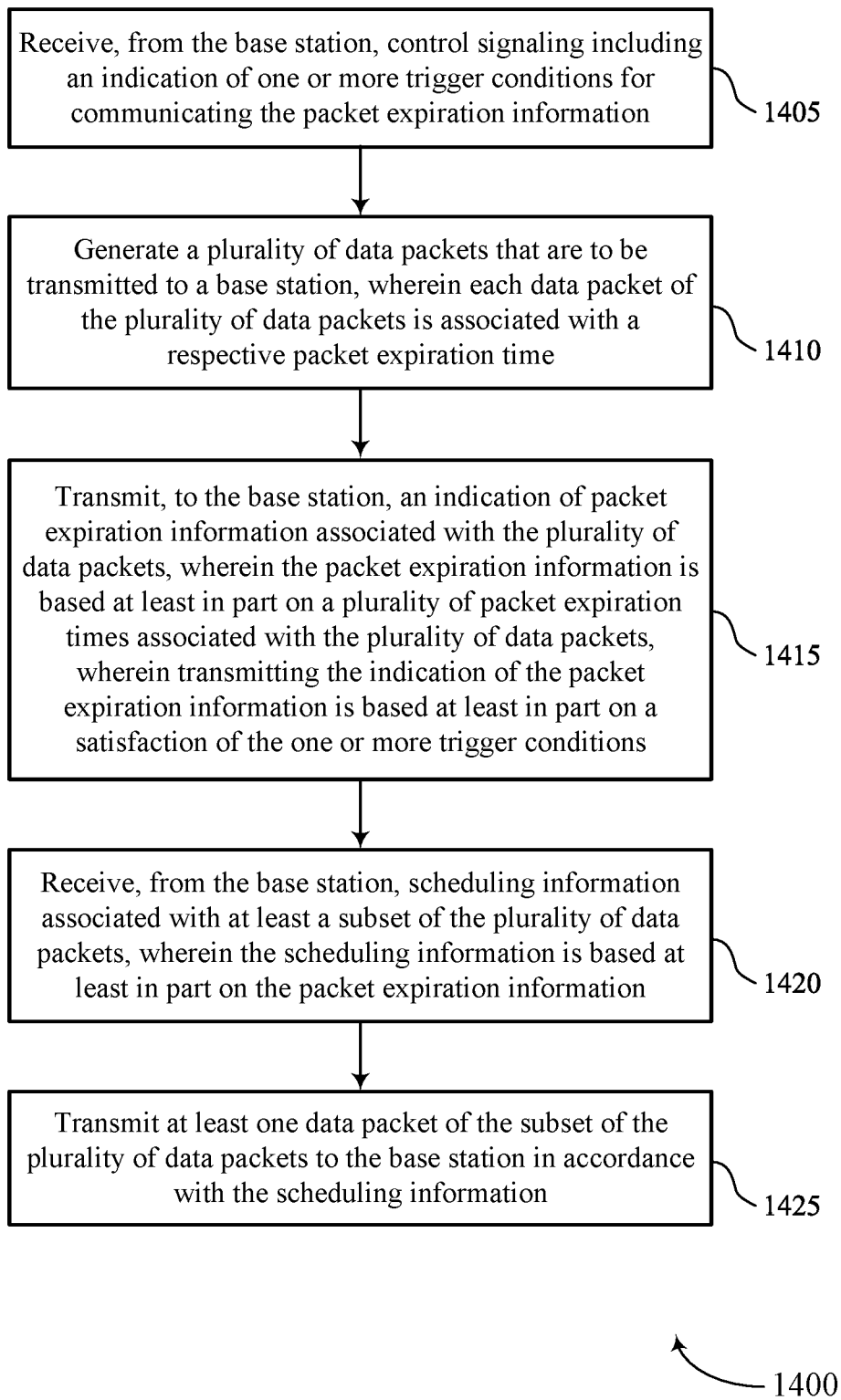

FIG. 14 shows a flowchart illustrating a method 1400 that supports techniques for DAS in accordance with aspects of the present disclosure. The operations of the method 1400 may be implemented by a UE or its components as described herein. For example, the operations of the method 1400 may be performed by a UE 115 as described herein with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1405, the method may include receiving, from the base station, control signaling including an indication of one or more trigger conditions for communicating the packet expiration information. The operations of 1405 may be performed in accordance with examples as disclosed herein. In some examples, aspects of the operations of 1405 may be performed by a control signaling receiving manager 645 as described herein with reference to FIG. 6.

At 1410, the method may include generating a plurality of data packets that are to be transmitted to a base station, where each data packet of the plurality of data packets is associated with a respective packet expiration time. The operations of 1410 may be performed in accordance with examples as disclosed herein. In some examples, aspects of the operations of 1410 may be performed by a data packet generating manager 625 as described herein with reference to FIG. 6.

At 1415, the method may include transmitting, to the base station, an indication of packet expiration information associated with the plurality of data packets, where the packet expiration information is based at least in part on a plurality of packet expiration times associated with the plurality of data packets, where transmitting the indication of the packet expiration information is based at least in part on a satisfaction of the one or more trigger conditions. The operations of 1415 may be performed in accordance with examples as disclosed herein. In some examples, aspects of the operations of 1415 may be performed by a packet expiration information manager 630 as described herein with reference to FIG. 6.

At 1420, the method may include receiving, from the base station, scheduling information associated with at least a subset of the plurality of data packets, where the scheduling information is based at least in part on the packet expiration information. The operations of 1420 may be performed in accordance with examples as disclosed herein. In some examples, aspects of the operations of 1420 may be performed by a scheduling information receiving manager 635 as described herein with reference to FIG. 6.

At 1425, the method may include transmitting at least one data packet of the subset of the plurality of data packets to the base station in accordance with the scheduling information. The operations of 1425 may be performed in accordance with examples as disclosed herein. In some examples, aspects of the operations of 1425 may be performed by a data packet transmitting manager 640 as described herein with reference to FIG. 6.

Figure 15:
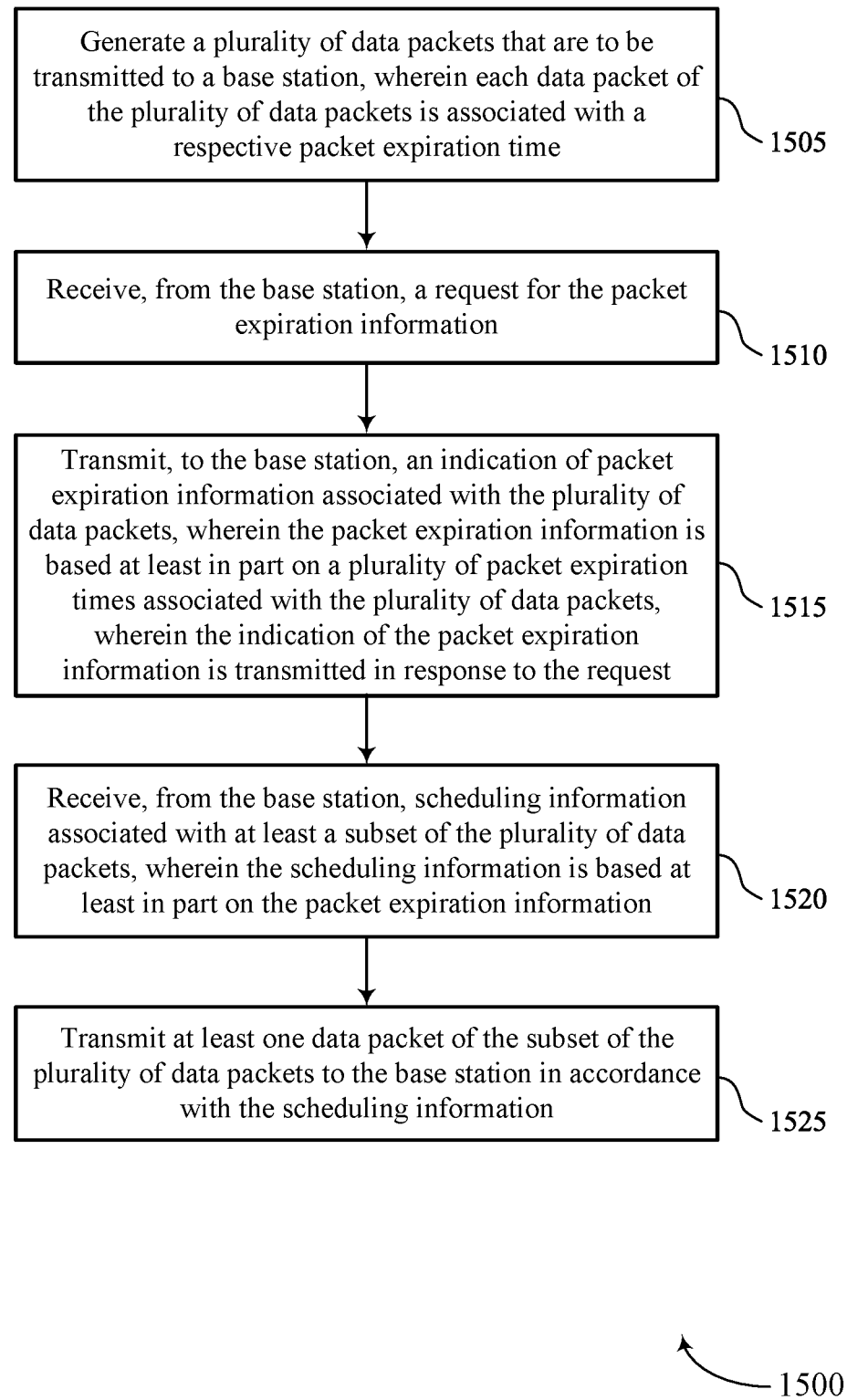

FIG. 15 shows a flowchart illustrating a method 1500 that supports techniques for DAS in accordance with aspects of the present disclosure. The operations of the method 1500 may be implemented by a UE or its components as described herein. For example, the operations of the method 1500 may be performed by a UE 115 as described herein with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1505, the method may include generating a plurality of data packets that are to be transmitted to a base station, where each data packet of the plurality of data packets is associated with a respective packet expiration time. The operations of 1505 may be performed in accordance with examples as disclosed herein. In some examples, aspects of the operations of 1505 may be performed by a data packet generating manager 625 as described herein with reference to FIG. 6.

At 1510, the method may include receiving, from the base station, a request for the packet expiration information. The operations of 1510 may be performed in accordance with examples as disclosed herein. In some examples, aspects of the operations of 1510 may be performed by a request receiving manager 650 as described herein with reference to FIG. 6.

At 1515, the method may include transmitting, to the base station, an indication of packet expiration information associated with the plurality of data packets, where the packet expiration information is based at least in part on a plurality of packet expiration times associated with the plurality of data packets, where the indication of the packet expiration information is transmitted in response to the request. The operations of 1515 may be performed in accordance with examples as disclosed herein. In some examples, aspects of the operations of 1515 may be performed by a packet expiration information manager 630 as described herein with reference to FIG. 6.

At 1520, the method may include receiving, from the base station, scheduling information associated with at least a subset of the plurality of data packets, where the scheduling information is based at least in part on the packet expiration information. The operations of 1520 may be performed in accordance with examples as disclosed herein. In some examples, aspects of the operations of 1520 may be performed by a scheduling information receiving manager 635 as described herein with reference to FIG. 6.

At 1525, the method may include transmitting at least one data packet of the subset of the plurality of data packets to the base station in accordance with the scheduling information. The operations of 1525 may be performed in accordance with examples as disclosed herein. In some examples, aspects of the operations of 1525 may be performed by a data packet transmitting manager 640 as described herein with reference to FIG. 6.

Figure 16:
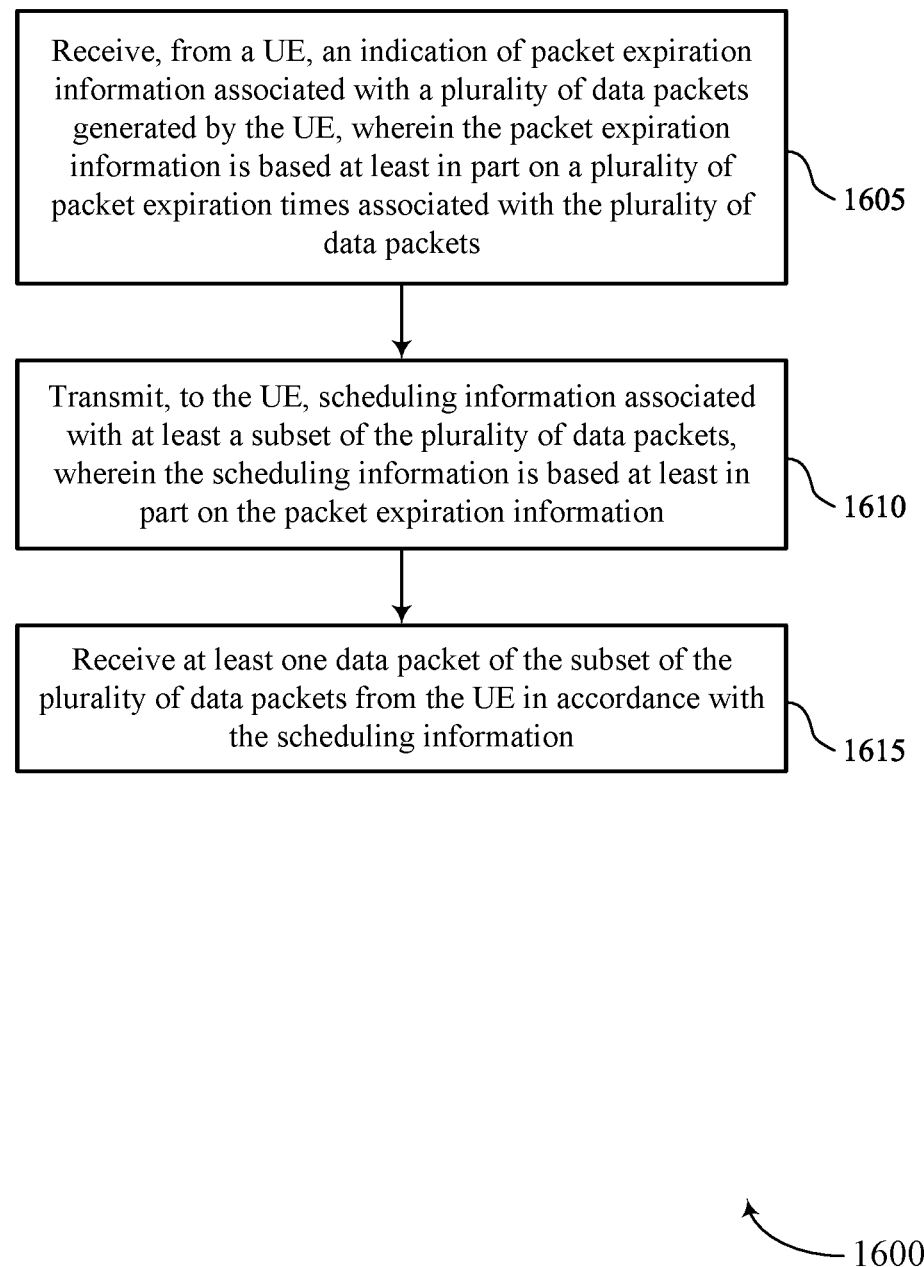

FIG. 16 shows a flowchart illustrating a method 1600 that supports techniques for DAS in accordance with aspects of the present disclosure. The operations of the method 1600 may be implemented by a base station or its components as described herein. For example, the operations of the method 1600 may be performed by a base station 105 as described herein with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1605, the method may include receiving, from a UE, an indication of packet expiration information associated with a plurality of data packets generated by the UE, where the packet expiration information is based at least in part on a plurality of packet expiration times associated with the plurality of data packets. The operations of 1605 may be performed in accordance with examples as disclosed herein. In some examples, aspects of the operations of 1605 may be performed by a packet expiration information receiving manager 1025 as described herein with reference to FIG. 10.

At 1610, the method may include transmitting, to the UE, scheduling information associated with at least a subset of the plurality of data packets, where the scheduling information is based at least in part on the packet expiration information. The operations of 1610 may be performed in accordance with examples as disclosed herein. In some examples, aspects of the operations of 1610 may be performed by a scheduling information transmitting manager 1030 as described herein with reference to FIG. 10.

At 1615, the method may include receiving at least one data packet of the subset of the plurality of data packets from the UE in accordance with the scheduling information. The operations of 1615 may be performed in accordance with examples as disclosed herein. In some examples, aspects of the operations of 1615 may be performed by a data packet receiving manager 1035 as described herein with reference to FIG. 10.

The following provides an overview of aspects of the present disclosure:

Aspect 1: A method for wireless communication at a UE, comprising: generating a plurality of data packets that are to be transmitted to a base station, wherein each data packet of the plurality of data packets is associated with a respective packet expiration time; transmitting, to the base station, an indication of packet expiration information associated with the plurality of data packets, wherein the packet expiration information is based at least in part on a plurality of packet expiration times associated with the plurality of data packets; receiving, from the base station, scheduling information associated with at least a subset of the plurality of data packets, wherein the scheduling information is based at least in part on the packet expiration information; and transmitting at least one data packet of the subset of the plurality of data packets to the base station in accordance with the scheduling information.

Aspect 2: The method of aspect 1, further comprising: receiving, from the base station, control signaling including an indication of a periodicity associated with a plurality of transmission occasions for communicating the packet expiration information, wherein the indication of the packet expiration information is transmitted in accordance with the indicated periodicity and within a transmission occasion of the plurality of transmission occasions.

Aspect 3: The method of any of aspects 1 through 2, further comprising: receiving, from the base station, control signaling including an indication of one or more trigger conditions for communicating the packet expiration information, wherein transmitting the indication of the packet expiration information is based at least in part on a satisfaction of the one or more trigger conditions.

Aspect 4: The method of aspect 3, wherein the satisfaction of the one or more trigger conditions is based at least in part on a packet expiration time of the plurality of packet expiration times satisfying a duration threshold, a change in the packet expiration information satisfying some change threshold, a QoS requirement at the UE satisfying a threshold quality, a processing capability of the UE satisfying a processing capability threshold, or any combination thereof.

Aspect 5: The method of any of aspects 1 through 4, further comprising: receiving, from the base station, a request for the packet expiration information, wherein the indication of the packet expiration information is transmitted in response to the request.

Aspect 6: The method of aspect 5, wherein the request is received via a DCI message, a MAC-CE message, or both.

Aspect 7: The method of any of aspects 1 through 6, further comprising: determining the packet expiration information in accordance with a packet expiry configuration, the packet expiry configuration comprising one or more mathematical operations for determining the packet expiration information based at least in part on the plurality of packet expiration times.

Aspect 8: The method of aspect 7, further comprising: receiving, from the base station, a control message indicating the packet expiry configuration, wherein determining the packet expiration information is based at least in part on receiving the control message.

Aspect 9: The method of aspect 8, further comprising: receiving, from the base station, additional control signaling indicating a plurality of packet expiry configurations including the packet expiry configuration, wherein the control message is received based at least in part on receiving the additional control signaling, and wherein determining the packet expiration information is based at least in part on receiving the additional control signaling.

Aspect 10: The method of any of aspects 7 through 9, wherein determining the packet expiration information in accordance with the packet expiry configuration comprises: determining an average of the plurality of packet expiration times, a median of the plurality of packet expiration times, a minimum of the plurality of packet expiration times, a maximum of the plurality of packet expiration times, or any combination thereof.

Aspect 11: The method of any of aspects 1 through 10, wherein transmitting the at least one data packet of the plurality of data packets comprises: identifying that a first data packet of the plurality of data packets is valid based at least in part on the scheduling information and a first packet expiration time corresponding to the first data packet; and transmitting the first data packet based at least in part on identifying that the first data packet is valid, wherein the at least one transmitted data packet includes the first data packet.

Aspect 12: The method of aspect 11, further comprising: identifying that a second data packet of the plurality of data packets is expired based at least in part on the scheduling information and a second packet expiration time corresponding to the second data packet; and refraining from transmitting the second data packet based at least in part on identifying that the second data packet is expired.

Aspect 13: The method of aspect 12, further comprising: discarding the second data packet from a transmission buffer at the UE based at least in part on identifying that the second data packet is expired, wherein refraining from transmitting the second data packet is based at least in part on discarding the second data packet.

Aspect 14: The method of any of aspects 1 through 13, wherein the indication of the packet expiration information is transmitted via a UCI message, a MAC-CE message, or both.

Aspect 15: A method for wireless communication at a base station, comprising: receiving, from a UE, an indication of packet expiration information associated with a plurality of data packets generated by the UE, wherein the packet expiration information is based at least in part on a plurality of packet expiration times associated with the plurality of data packets; transmitting, to the UE, scheduling information associated with at least a subset of the plurality of data packets, wherein the scheduling information is based at least in part on the packet expiration information; and receiving at least one data packet of the subset of the plurality of data packets from the UE in accordance with the scheduling information.

Aspect 16: The method of aspect 15, further comprising: determining a DAS metric associated with the UE based at least in part on the packet expiration information, an instantaneous achievable data rate at the UE, an average throughput at the UE, or any combination thereof, wherein transmitting the scheduling information is based at least in part on the DAS metric.

Aspect 17: The method of aspect 16, further comprising: receiving feedback information from the UE, wherein the instantaneous achievable data rate, the average throughput, or both, are based at least in part on the feedback information.

Aspect 18: The method of any of aspects 15 through 17, wherein receiving the indication of the packet expiration information comprises: receiving an indication of packet expiration information associated with a plurality of UEs including the UE; determining a plurality of DAS metrics associated with the plurality of UEs based at least in part on received packet expiration information corresponding to each UE of the plurality of UEs, wherein transmitting the scheduling information is based at least in part on the plurality of DAS metrics.

Aspect 19: The method of any of aspects 15 through 18, further comprising: transmitting, to the UE, control signaling including an indication of a periodicity associated with a plurality of transmission occasions for communicating the packet expiration information, wherein the indication of the packet expiration information is received in accordance with the indicated periodicity and within a transmission occasion of the plurality of transmission occasions.

Aspect 20: The method of any of aspects 15 through 19, further comprising: transmitting, to the UE, control signaling including an indication of one or more trigger conditions for communicating the packet expiration information, wherein receiving the indication of the packet expiration information is based at least in part on a satisfaction of the one or more trigger conditions.

Aspect 21: The method of aspect 20, wherein the satisfaction of the one or more trigger conditions is based at least in part on a packet expiration time of the plurality of packet expiration times satisfying a duration threshold, a change in the packet expiration information satisfying some change threshold, a QoS requirement at the UE satisfying a threshold quality, a processing capability of the UE satisfying a processing capability threshold, or any combination thereof.

Aspect 22: The method of any of aspects 15 through 21, further comprising: transmitting, to the UE, a request for the packet expiration information, wherein the indication of the packet expiration information is received in response to the request.

Aspect 23: The method of aspect 22, wherein the request is transmitted via a DCI message, a MAC-CE message, or both.

Aspect 24: The method of any of aspects 15 through 23, further comprising: transmitting, to the UE, a control message indicating a packet expiry configuration, wherein the packet expiration information is determined in accordance with the packet expiry configuration, the packet expiry configuration comprising one or more mathematical operations for determining the packet expiration information based at least in part on the plurality of packet expiration times.

Aspect 25: The method of aspect 24, further comprising: transmitting, to the UE, additional control signaling indicating a plurality of packet expiry configurations including the packet expiry configuration, wherein the control message is transmitted based at least in part on transmitting the additional control signaling.

Aspect 26: The method of any of aspects 15 through 25, wherein the indication of the packet expiration information is received via a UCI message, a MAC-CE message, or both.

Aspect 27: An apparatus for wireless communication at a UE, comprising a processor; memory coupled with the processor; and instructions stored in the memory and executable by the processor to cause the apparatus to perform a method of any of aspects 1 through 14.

Aspect 28: An apparatus for wireless communication at a UE, comprising at least one means for performing a method of any of aspects 1 through 14.

Aspect 29: A non-transitory computer-readable medium storing code for wireless communication at a UE, the code comprising instructions executable by a processor to perform a method of any of aspects 1 through 14.

Aspect 30: An apparatus for wireless communication at a base station, comprising a processor; memory coupled with the processor; and instructions stored in the memory and executable by the processor to cause the apparatus to perform a method of any of aspects 15 through 26.

Aspect 31: An apparatus for wireless communication at a base station, comprising at least one means for performing a method of any of aspects 15 through 26.

Aspect 32: A non-transitory computer-readable medium storing code for wireless communication at a base station, the code comprising instructions executable by a processor to perform a method of any of aspects 15 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   generating a plurality of data packets that are to be transmitted to a base station, wherein each data packet of the plurality of data packets is associated with a respective packet expiration time;
   transmitting, to the base station, an indication of packet expiration information associated with the plurality of data packets, wherein the packet expiration information is based at least in part on a plurality of packet expiration times associated with the plurality of data packets;
   receiving, from the base station, scheduling information associated with at least a subset of the plurality of data packets, wherein the scheduling information is based at least in part on the packet expiration information; and
   transmitting at least one data packet of the subset of the plurality of data packets to the base station in accordance with the scheduling information.

2. The method of claim 1, further comprising:
   receiving, from the base station, control signaling including an indication of a periodicity associated with a plurality of transmission occasions for communicating the packet expiration information, wherein the indication of the packet expiration information is transmitted in accordance with the indication of the periodicity and within a transmission occasion of the plurality of transmission occasions.

3. The method of claim 1, further comprising:
   receiving, from the base station, control signaling including an indication of one or more trigger conditions for communicating the packet expiration information, wherein transmitting the indication of the packet expiration information is based at least in part on a satisfaction of the one or more trigger conditions.

4. The method of claim 3, wherein the satisfaction of the one or more trigger conditions is based at least in part on a packet expiration time of the plurality of packet expiration times satisfying a duration threshold, a change in the packet expiration information satisfying a change threshold, a quality of service requirement at the UE satisfying a quality threshold, a processing capability of the UE satisfying a processing capability threshold, or any combination thereof.

5. The method of claim 1, further comprising:
   receiving, from the base station, a request for the packet expiration information, wherein the indication of the packet expiration information is transmitted in response to the request.

6. The method of claim 5, wherein the request is received via a downlink control information message, a medium access control-control element message, or both.

7. The method of claim 1, further comprising:
   determining the packet expiration information in accordance with a packet expiry configuration, the packet expiry configuration comprising one or more mathematical operations for determining the packet expiration information based at least in part on the plurality of packet expiration times.

8. The method of claim 7, further comprising:
   receiving, from the base station, a control message indicating the packet expiry configuration, wherein determining the packet expiration information is based at least in part on receiving the control message.

9. The method of claim 8, further comprising:
   receiving, from the base station, additional control signaling indicating a plurality of packet expiry configurations including the packet expiry configuration, wherein the control message is received based at least in part on receiving the additional control signaling, and wherein determining the packet expiration information is based at least in part on receiving the additional control signaling.

10. The method of claim 7, wherein determining the packet expiration information in accordance with the packet expiry configuration comprises:
determining an average of the plurality of packet expiration times, a median of the plurality of packet expiration times, a minimum of the plurality of packet expiration times, a maximum of the plurality of packet expiration times, or any combination thereof.

11. The method of claim 1, wherein transmitting the at least one data packet of the plurality of data packets comprises:
identifying that a first data packet of the plurality of data packets is valid based at least in part on the scheduling information and a first packet expiration time corresponding to the first data packet; and
transmitting the first data packet based at least in part on identifying that the first data packet is valid, wherein the at least one transmitted data packet includes the first data packet.

12. The method of claim 11, further comprising:
identifying that a second data packet of the plurality of data packets is expired based at least in part on the scheduling information and a second packet expiration time corresponding to the second data packet; and
refraining from transmitting the second data packet based at least in part on identifying that the second data packet is expired.

13. The method of claim 12, further comprising:
discarding the second data packet from a transmission buffer at the UE based at least in part on identifying that the second data packet is expired, wherein the refraining from transmitting the second data packet is based at least in part on discarding the second data packet.

14. The method of claim 1, wherein the indication of the packet expiration information is transmitted via an uplink control information message, a medium access control-control element message, or both.

15. A method for wireless communication at a base station, comprising:
receiving, from a user equipment (UE), an indication of packet expiration information associated with a plurality of data packets generated by the UE, wherein the packet expiration information is based at least in part on a plurality of packet expiration times associated with the plurality of data packets;
transmitting, to the UE, scheduling information associated with at least a subset of the plurality of data packets, wherein the scheduling information is based at least in part on the packet expiration information; and
receiving at least one data packet of the subset of the plurality of data packets from the UE in accordance with the scheduling information.

16. The method of claim 15, further comprising:
determining a deadline-aware scheduling metric associated with the UE based at least in part on the packet expiration information, an instantaneous achievable data rate at the UE, an average throughput at the UE, or any combination thereof, wherein transmitting the scheduling information is based at least in part on the deadline-aware scheduling metric.

17. The method of claim 16, further comprising:
receiving feedback information from the UE, wherein the instantaneous achievable data rate, the average throughput, or both, are based at least in part on the feedback information.

18. The method of claim 15, wherein receiving the indication of the packet expiration information comprises:
receiving an indication of packet expiration information associated with a plurality of UEs including the UE; and
determining a plurality of deadline-aware scheduling metrics associated with the plurality of UEs based at least in part on received packet expiration information corresponding to each UE of the plurality of UEs, wherein transmitting the scheduling information is based at least in part on the plurality of deadline-aware scheduling metrics.

19. The method of claim 15, further comprising:
transmitting, to the UE, control signaling including an indication of a periodicity associated with a plurality of transmission occasions for communicating the packet expiration information, wherein the indication of the packet expiration information is received in accordance with the indication of the periodicity and within a transmission occasion of the plurality of transmission occasions.

20. The method of claim 15, further comprising:
transmitting, to the UE, control signaling including an indication of one or more trigger conditions for communicating the packet expiration information, wherein receiving the indication of the packet expiration information is based at least in part on a satisfaction of the one or more trigger conditions.

21. The method of claim 20, wherein the satisfaction of the one or more trigger conditions is based at least in part on a packet expiration time of the plurality of packet expiration times satisfying a duration threshold, a change in the packet expiration information satisfying a change threshold, a quality of service requirement at the UE satisfying a quality threshold, a processing capability of the UE satisfying a processing capability threshold, or any combination thereof.

22. The method of claim 15, further comprising:
transmitting, to the UE, a request for the packet expiration information, wherein the indication of the packet expiration information is received in response to the request.

23. The method of claim 22, wherein the request is transmitted via a downlink control information message, a medium access control-control element message, or both.

24. The method of claim 15, further comprising:
transmitting, to the UE, a control message indicating a packet expiry configuration, wherein the packet expiration information is determined in accordance with the packet expiry configuration, the packet expiry configuration comprising one or more mathematical operations for determining the packet expiration information based at least in part on the plurality of packet expiration times.

25. The method of claim 24, further comprising:
transmitting, to the UE, additional control signaling indicating a plurality of packet expiry configurations including the packet expiry configuration, wherein the control message is transmitted based at least in part on transmitting the additional control signaling.

26. The method of claim 15, wherein the indication of the packet expiration information is received via an uplink control information message, a medium access control-control element message, or both.

27. An apparatus for wireless communication at a user equipment (UE), comprising:
a processor; and
a memory coupled with the processor, with instructions in the memory, the instructions being executable by the processor to cause the apparatus to:

generate a plurality of data packets that are to be transmitted to a base station, wherein each data packet of the plurality of data packets is associated with a respective packet expiration time;

transmit, to the base station, an indication of packet expiration information associated with the plurality of data packets, wherein the packet expiration information is based at least in part on a plurality of packet expiration times associated with the plurality of data packets;

receive, from the base station, scheduling information associated with at least a subset of the plurality of data packets, wherein the scheduling information is based at least in part on the packet expiration information; and transmit at least one data packet of the subset of the plurality of data packets to the base station in accordance with the scheduling information.

28. The apparatus of claim 27, wherein the instructions are further executable by the processor to cause the apparatus to:

receive, from the base station, control signaling including an indication of a periodicity associated with a plurality of transmission occasions for communicating the packet expiration information, wherein the indication of the packet expiration information is transmitted in accordance with the indication of the periodicity and within a transmission occasion of the plurality of transmission occasions.

29. An apparatus for wireless communication at a base station, comprising:

a processor; and a memory coupled with the processor, with instructions in the memory, the instructions being executable by the processor to cause the apparatus to:

receive, from a user equipment (UE), an indication of packet expiration information associated with a plurality of data packets generated by the UE, wherein the packet expiration information is based at least in part on a plurality of packet expiration times associated with the plurality of data packets;

transmit, to the UE, scheduling information associated with at least a subset of the plurality of data packets, wherein the scheduling information is based at least in part on the packet expiration information; and receive at least one data packet of the subset of the plurality of data packets from the UE in accordance with the scheduling information.

30. The apparatus of claim 29, wherein the instructions are further executable by the processor to cause the apparatus to:

determine a deadline-aware scheduling metric associated with the UE based at least in part on the packet expiration information, an instantaneous achievable data rate at the UE, an average throughput at the UE, or any combination thereof, wherein transmitting the scheduling information is based at least in part on the deadline-aware scheduling metric.

* * * * *